US009466999B2

(12) United States Patent
Ishii et al.

(10) Patent No.: US 9,466,999 B2
(45) Date of Patent: Oct. 11, 2016

(54) VEHICLE WITH AN ELECTRIC STORAGE SECTION CAPABLE OF DISCHARGING (SUPPLYING) AN ELECTRIC POWER TO AN EXTERNAL ELECTRIC LOAD, DISCHARGE SYSTEM INCLUDING THE VEHICLE AND A POWER CABLE, METHOD FOR DISCHARGING THE ELECTRIC STORAGE SECTION, AND EQUIPMENT EXTERNAL TO THE VEHICLE USED IN THE DISCHARGE SYSTEM

(75) Inventors: Daisuke Ishii, Toyota (JP); Shigeki Kinomura, Shizuoka-ken (JP); Tomoyuki Mizuno, Toyota (JP); Takashi Ogawa, Kariya (JP); Hiroki Sawada, Toyota (JP); Yasuo Suzuki, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 346 days.

(21) Appl. No.: 14/355,082

(22) PCT Filed: Aug. 6, 2012

(86) PCT No.: PCT/JP2012/070580
§ 371 (c)(1),
(2), (4) Date: Sep. 15, 2014

(87) PCT Pub. No.: WO2013/065380
PCT Pub. Date: May 10, 2013

(65) Prior Publication Data
US 2015/0042288 A1 Feb. 12, 2015

(51) Int. Cl.
*H02J 7/00* (2006.01)
*B60L 11/18* (2006.01)
(Continued)

(52) U.S. Cl.
CPC ............ *H02J 7/0063* (2013.01); *B60L 3/0023* (2013.01); *B60L 3/0046* (2013.01); *B60L 3/04* (2013.01);
(Continued)

(58) Field of Classification Search
CPC . Y02E 60/12; Y02E 60/721; Y02E 60/6217; Y02E 60/7005; Y02E 60/7077; Y02E 60/7088; Y02E 60/7225; Y02E 60/7241; H01M 10/44; H02J 7/0063; H02J 7/0065; H02J 2007/0067; B60L 2210/14; B60L 2210/40; B60L 2210/22; B60L 2210/30; Y02T 10/6217; Y02T 10/7005; Y02T 70/7077; Y02T 10/7088; Y02T 10/7225; Y02T 10/7241
USPC ........................................................ 320/135
See application file for complete search history.

(56) References Cited

U.S. PATENT DOCUMENTS 5,596,258 A * 1/1997 Kimura ................. B60L 3/0084
320/109
6,131,680 A 10/2000 Nii et al.
(Continued)

FOREIGN PATENT DOCUMENTS

EP 2 279 896 A2 2/2011
JP 09-308012 11/1997
(Continued)

OTHER PUBLICATIONS

International Electrotechnical Commission, International Standard, IEC 61851-1 Edition 2.0, Nov. 2010.
(Continued)

*Primary Examiner* — Edward Tso
*Assistant Examiner* — Mohammed J Sharief
(74) *Attorney, Agent, or Firm* — Finnegan, Henderson, Farabow, Garrett & Dunner, LLP

(57) ABSTRACT

A vehicle 10 according to an embodiment of the present invention is applied to a charge-discharge system CDS. The charge-discharge system includes the vehicle 10, an electric power cable 20, a plug-in station 30, a HEMS 40, and a commercial power supply 50. In a state where the connector 21 of the electric power cable 20 is connected with the inlet of the vehicle 10, an electric power is discharged/supplied from the vehicle electric storage device 11 to an external electric load (e.g., external electric storage device 41). Further, the vehicle electric storage device 11 is capable of being charged by the external power supply 50 through the electric power cable 20. A control device 12 of the vehicle 10 obtains/detects a permissible current value of the electric power cable 20, based on a specific signal (control pilot signal) which is transmitted through a CPLT terminal of the connector 21 before it starts the discharge to the external electric load from the vehicle electric storage device 11.

9 Claims, 10 Drawing Sheets

(51) Int. Cl.

| | | |
|---|---|---|
| *B60L 3/00* | (2006.01) | |
| *B60L 3/04* | (2006.01) | |
| *H02J 7/02* | (2016.01) | |
| *H02J 7/04* | (2006.01) | |
| *B60L 11/12* | (2006.01) | |
| *B60L 11/14* | (2006.01) | |

(52) U.S. Cl.
CPC ............ *B60L 11/123* (2013.01); *B60L 11/14* (2013.01); *B60L 11/1816* (2013.01); *B60L 11/1818* (2013.01); *B60L 11/1842* (2013.01); *H02J 7/027* (2013.01); *H02J 7/045* (2013.01); *B60L 2210/14* (2013.01); *B60L 2210/40* (2013.01); *B60L 2230/22* (2013.01); *B60L 2230/30* (2013.01); *H02J 2007/0067* (2013.01); *Y02E 60/721* (2013.01); *Y02T 10/6217* (2013.01); *Y02T 10/7005* (2013.01); *Y02T 10/7077* (2013.01); *Y02T 10/7088* (2013.01); *Y02T 10/7225* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01)

(56) References Cited

U.S. PATENT DOCUMENTS 9,174,627 B2 * 11/2015 Atsumi ................... F02D 29/06

| | | | |
|---|---|---|---|
| 2009/0058097 A1 | 3/2009 | Oyobe et al. | |
| 2010/0007306 A1* | 1/2010 | Fukui .................... | B60K 6/445 320/107 |
| 2010/0134067 A1 | 6/2010 | Baxter et al. | |
| 2010/0213896 A1 | 8/2010 | Ishii et al. | |
| 2010/0241297 A1 | 9/2010 | Aoki et al. | |
| 2011/0121779 A1 | 5/2011 | Ichikawa et al. | |
| 2011/0175569 A1* | 7/2011 | Austin ................ | B60L 11/1824 320/109 |
| 2012/0193983 A1 | 8/2012 | Yukizane et al. | |
| 2013/0015700 A1 | 1/2013 | Ichikawa | |

FOREIGN PATENT DOCUMENTS

| | | |
|---|---|---|
| JP | 2009-126450 | 6/2009 |
| JP | 2010-35277 | 2/2010 |
| WO | WO 2009/035069 A1 | 3/2009 |
| WO | WO 2011/045925 A1 | 4/2011 |
| WO | WO 2011/125215 A1 | 10/2011 |

OTHER PUBLICATIONS

"Electric Vehicle Conductive Charging System General Requirements," Japan Electric Vehicle Association Standards Committee, JEVS G 109 (Mar. 29, 2001), pp. 1-34.

Written Opinion of the International Searching Authority in International Application No. PCT/JP2012/070580 (Sep. 4, 2013).

SAE International Surface Vehicle Recommended Practice, SAEJ1772 (Jan. 2010).

* cited by examiner

VEHICLE WITH AN ELECTRIC STORAGE SECTION CAPABLE OF DISCHARGING (SUPPLYING) AN ELECTRIC POWER TO AN EXTERNAL ELECTRIC LOAD, DISCHARGE SYSTEM INCLUDING THE VEHICLE AND A POWER CABLE, METHOD FOR DISCHARGING THE ELECTRIC STORAGE SECTION, AND EQUIPMENT EXTERNAL TO THE VEHICLE USED IN THE DISCHARGE SYSTEM

CROSS-REFERENCE TO RELATED APPLICATIONS

This application is a national phase application of International Application No. PCT/JP2012/070580, filed Aug. 6, 2011, and claims the priority of Japanese Application No. 2011-239020, filed Oct. 31,2011, the content of both of which is incorporated herein by reference.

TECHNICAL FIELD

The present invention relates to: a vehicle having an electric storage section which can be discharged by supplying an electric power to an external electric load connected with the electric storage section through a electric power cable; a discharge system including the vehicle and the electric power cable; a method for controlling discharge of the electric storage section; and an equipment external to the vehicle used in the discharge system.

BACKGROUND ART

Conventionally, there has been known a charge-discharge system, which can charge an electric storage device mounted on a vehicle with (by) a power source (supply) external to the vehicle, and which can supply an electric power from the electric storage device mounted on the vehicle to an electric load external to the vehicle (including an electric storage device external to the vehicle, and the like). Supplying the electric power from the electric storage device mounted on the vehicle to the electric load external to the vehicle means discharging in terms of (or for) the electric storage device mounted on the vehicle. Accordingly, in the present specification, supplying the electric power from the electric storage device mounted on the vehicle to the electric load external to the vehicle may also be expressed as "discharging to the electric load external to the vehicle." Further, the electric storage device mounted on the vehicle may also be referred to as a "vehicle (on-board) electric storage device", and the electric storage device external to (outside of) the vehicle may also be referred to as an "external (off-board) electric storage device." Furthermore, the power source (supply) external to (outside of) the vehicle may also be simply referred to as an "external power source", and the electric load external to (outside of) the vehicle" may also be simply referred to as an "external electric load." The external electric storage device can be the external electric load as well as the external power source.

Meanwhile, as a standard for an electric vehicle whose vehicle electric storage device can be charged from a home (external power source), "SAE Electric Vehicle Conductive Charge Coupler (refer to Document No. 1 below)" has been adopted in the United States of America", and a "general requirement for electric vehicle conductive charge system" has been adopted in Japan (refer to Document No. 2 below).

Document No. 1; United States of America Standard SAEJ1722, SAE international, November, 2001

Document No. 2; General requirements of conductive charge system for an electric vehicle (Japan Electric Vehicle Association (JEVA) standard), Mar. 29, 2001

In those standards, for example, a standard regarding "control pilot" is defined. The control pilot is a control line, and is defined as follows.

Equipment ground (grounding conductor)—A conductor used to connect the non-current carrying metal parts of the EV supply equipment to the system grounding conductor, the grounding electrode conductor, or both at the service equipment.

Control pilot—The primary control conductor that is connected to the equipment ground through control circuitry on the vehicle and performs certain functions.

Electric Vehicle Supply Equipment (EVSE)—The conductors, including the ungrounded, grounded, and equipment grounding conductors, the electric vehicle connectors, attachment plugs, and all other fittings, devices, power outlets, or apparatuses installed specifically for the purpose of delivering energy from the premises wiring to the electric vehicle.

A signal transmitted through the control line (control pilot) is referred to as a control pilot signal, a CPLT signal, or simply a "CPLT." The control pilot signal is used by the control circuit on the vehicle (on board control apparatus) to perform the following functions:

a. verifies that the vehicle is present and connected;
b. permits energization/de-energization of the supply;
c. transmits supply equipment current rating to the vehicle;
d. monitors the presence of the equipment ground; and so on.

On the other hand, in the charge-discharge system, the vehicle control unit controls "charging (charge of) the vehicle electric storage device using the electric power supplied from the external power supply" and "discharging (discharge) to the external electric load form the vehicle electric storage device." Accordingly, the control unit of the vehicle needs to recognize/determine whether the charge of the vehicle electric storage device should be performed using the electric power supplied from the external power source (that is, request for charge is being generated) or the discharge from the vehicle electric storage device to the external electric load should be performed (that is, request for discharge is being generated).

One of known arts uses a charging cable, and a discharging cable different from the charging cable, and differentiates the control pilot signal for the charging cable from the control pilot signal for the discharging cable. Further, when the power cable is connected with the vehicle, the vehicle control circuit is configured so as to determine based on the control pilot signal whether the connected power cable is the charging cable or the discharging cable, and determine based on the determination whether the request for charge is occurring or the request for discharge is occurring (refer to Japanese Patent Application Laid-Open (kokai) No. 2010-35277, paragraph 0072 etc.).

SUMMARY OF THE INVENTION

Incidentally, when the vehicle electric storage device is charged using the electric power supplied from the external power supply through the charging cable, a current rating (permissible current value) of the charging cable is notified to the control unit of the vehicle, and the control unit controls charging utilizing the notified current rating (refer to, for example, United States of America Standard SAEJ1722, and International standard IEC61851). However, no technique is known that concerns a limit of discharging current when discharging from the vehicle electric storage device to the external electric load. Further, there is no art which discusses in detail how to notify a "current rating (permissible current value) of an electric power cable when discharging" to the vehicle control unit.

A vehicle according to the present invention is made to cope with the problem described above.

More specifically, the vehicle according to the present invention comprises:

an inlet to which a connector of an electric power cable is connected;

an electric storage section which can be discharged to an external electric load through the electric power cable; and a control device which controls discharging from the electric storage section to the external electric load in a state in which (while) the connector is connected with the inlet.

Further, in the vehicle of the present invention, the control device is configured so as to obtain a permissible current value of the electric power cable based on a specific signal (transmitted) from the electric power cable before starting discharging.

The electric storage section may include a "vehicle electric storage device which is mounted on the vehicle and can be charged with (using) an electric power supplied from the external power supply", and a "generator (electric power generating apparatus) which is mounted on the vehicle and generates, based on (using) an energy other than electricity, an electric power which is used to charge the vehicle electric storage device." The electric storage section may include the vehicle electric storage device only.

According to the configuration described above, the specific signal representing the permissible current value (current rating) is provided from the electric power cable to the control device. The control device can obtain, based on the provided specific signal, the permissible current value of the electric power cable, before starting the discharge. Accordingly, the control device can control the discharge of the electric storage section mounted on the vehicle based on the permissible current value of the electric power cable. It should be noted that the "control of the discharge" may include any controls as long as they relates to controls concerning the discharge from the electric storage section to the external electric load, and therefore, include a control of a discharge current, stopping the discharge, and so on. Further, the expression of "before starting discharging" may be a period starting from a first point in time to a second point in time, the first point in time being a point in time at which a connection state of the connector of the electric power cable is changed from a state where the connector is unconnected to the inlet to a state where the connector is connected to the inlet, or the first point in time being a point in time at which the control device recognizes that the request for discharge is generated, and the second point in time being a point in time at which the discharge from the vehicle electric storage section to the external electric load is actually started.

In the present invention, the control device is configured so as to stop the discharge when a current flowing through the electric power cable exceeds the obtained permissible current value while (in a period in which) the discharge is being performed.

According to this configuration, the power electric cable can be more surely protected when the discharge is performed.

One of aspects of the present invention, the electric storage section is capable of being charged using an electric power supplied from an external power supply through the electric power cable;

the inlet includes a receiving side CPLT terminal, which is electrically connected with a sending side CPLT terminal to receive a control pilot signal, the sending side CPLT terminal being a terminal, which the connector of the electric power cable includes, and to which the control pilot signal representing a permissible current value of the electric power cable is provided when charging the electric storage section; and the control device is configured so as to obtain, based on the control pilot signal, the permissible current value of the electric power cable before starting charging the electric storage section using the electric power supplied from the external power supply, in the state in which the connector of the electric power cable is connected with the inlet, and so as to receive the specific signal through the receiving side CPLT terminal.

This configuration enables charging the electric storage section using the charging cable which is in conformity to the known standard with the external power supply. In other words, it is possible to notify the control device of the permissible current value of the electric power cable which is used when the discharge is performed, without greatly changing the known standard.

In this case (i.e., when the control device is configured so as to receive the specific signal through the receiving side CPLT terminal), it is preferable that, the control pilot signal be a signal having a duty cycle (duty ratio) which has a predetermined relation with the permissible current value of the electric power cable when the charge of the electric storage section is performed; and the specific signal received through the receiving side CPLT terminal be a signal having a duty cycle (duty ratio) which has the described predetermined relation with the permissible current value of the electric power cable when the discharge from the electric storage section to the external electric load is performed.

According to this configuration, it is possible to notify the control device of the permissible current value of the electric power cable used when the discharge is performed, by using a standard which is the same as one used when the charge of the electric storage section using the external power supply is performed.

Further, in one of aspects of the present invention, the electric storage section is configured so as to be capable of being charged using the electric power supplied from the external power supply through a charging cable including a connector for charging, which is different from the electric power cable;

the inlet includes a receiving side CPLT terminal, which is electrically connected with a sending side CPLT terminal to receive a control pilot signal, the sending side CPLT terminal being a terminal, which the connector of the charging cable includes, and to which the control pilot signal representing a permissible current value of the charging cable is provided when charging the electric storage section, in a state in which (while) the connector for charging of the charging cable is connected with the inlet; and the control device is configured so as to obtain, based on the control pilot signal, the permissible current value of the charging cable before starting charging the electric storage section using the electric power supplied from the external power supply, in the state in which the connector of the charging cable is connected with the inlet, and so as to receive the specific signal through the receiving side CPLT terminal.

This configuration also allows the charging cable which is in conformity to the known standard to be used to charge the electric storage section by the external power supply. In other words, it is possible to notify the control device of the permissible current value of the electric power cable which is used when the discharge to the external electric load is performed, without greatly changing the known standard.

In this case (i.e., when the control device is configured so as to receive the specific signal through the receiving side CPLT terminal), it is preferable that, the control pilot signal be a signal having a duty cycle (duty ratio) which has a predetermined relation with the permissible current value of the charging cable; and the specific signal received through the receiving side CPLT terminal be a signal having a duty cycle (duty ratio) which has the described predetermined relation with the permissible current value of the electric power cable.

According to this configuration as well, it is possible to notify the control device of the permissible current value of the electric power cable used when the discharge is performed, by using a standard which is the same as one used when the charge of the electric storage section using the external power supply is performed.

There has recently been studied the "charge with the external power supply" using an energy management system provided to a facility (a home, a condominium building, and the like) external to the vehicle, such as a HEMS (Home Energy Management System) or a BEMS (Building Energy Management System). Those systems (but not limited to those systems) can perform the charge of the electric storage section with the external power supply, more effectively, more inexpensively, or using a renewable energy as much as possible.

Generally, in those systems, a bidirectional communication (e.g., PLC; Power Line Communication) is used to exchange information between the system and the control device of the vehicle.

Accordingly, if the control device of the vehicle includes a second communication unit which is capable of communicating with a first unit provided at a location external to the vehicle, the request for discharge (request for starting discharging) can be provided to the control device of the vehicle using the communication. In this case, the permissible current value (current rating) of the electric power cable used for the discharge to the external electric load from the electric storage section can be transmitted to the control device of the vehicle using the first communication unit and the second communication unit. However, an equipment which determines the content transmitted from the first communication unit to the second communication unit does not always have the "correct permissible current value of the electric power cable used for the discharge", for example, when the electric power cable is replaced.

Meanwhile, it is known (or defined/prescribed by the standard) to set the control pilot signal to (at) a duty signal having a certain/predetermined duty cycle (ratio) when charging the electric storage section using the external power supply. This is because, if a circuit which generates the duty signal is provided/attached to the cable used to charge the electric storage section, the permissible current value (current rating) of the cable can certainly be notified to the control device of the vehicle, whatever cable is used.

In view of the above, even if the control device of the vehicle includes the second communication unit capable of communicating with the first communication unit provided at the location external to the vehicle through the electric power cable, it is preferable that the permissible current value (current rating) of the electric power cable used for discharging to the external electric load from the electric storage section be transmitted to the control device of the vehicle by not only using the communication between the first communication unit and the second communication unit, but also transmitting/sending the duty signal serving as the specific signal to the CPLT terminal, similarly to when charging the electric storage section, in order to notify the control device of the vehicle of the permissible current value. According to this configuration, the permissible current value of the electric power cable used for the discharge can accurately/properly be notified to the control unit of the vehicle.

In one of aspects of the present invention, the control device is configured so as to include a second communication unit capable of communicating with a first communication unit provided at a location external to the vehicle through the electric power cable, so as to start discharging in response to a request for discharge which is transmitted to the second communication unit from the first communication unit, and so as to obtain the specific signal without using the second communication unit.

Further, it is preferable that the control device be configured:

so as to include the second communication unit capable of communicating with the first communication unit through the electric power cable;

so as to control the discharge form the electric storage section to the external electric load based on the permissible current value transmitted from the first communication unit to the second communication unit and the permissible current value obtained based on the specific signal, whichever is smaller; and so as to obtain the specific signal without using the second communication unit.

According to this configuration, even if the equipment (e.g., computer of the HEMS) which obtains information to be transmitted to the second communication unit from the first communication unit using the communication falsely recognizes the "permissible current value of the electric power cable used for the discharge" as a "value larger than an actual (true) value", the control of the discharge can be carried out based on the "permissible current value of the electric power cable, which is obtained based on the specific signal." Therefore, the electric power cable can certainly be protected when performing the discharge.

Further, it is preferable that the control device be configured so as to stop discharging, when a current flowing through the electric power cable while the discharge is being performed exceeds the permissible current value transmitted from the first communication unit to the second communication unit and the permissible current value obtained based on the specific signal, whichever is smaller.

According to this configuration, the electric power cable can more certainly be protected when performing the discharge. It should be noted that the present invention can include/cover a discharge control method of the electric storage section of the vehicle, a discharge system including the vehicle and the electric power cable, and an equipment external to the vehicle which constitute a part of the discharge system.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE EMBODIMENT TO CARRY OUT THE INVENTION

A vehicle according to an embodiment of the present invention will now be described with reference to the drawings. The vehicle is applied to a discharge system. The discharge system is a system which supplies an electric power to an external electric load (which may include an external electric storage device) from a vehicle (on-board) electric storage section. This discharge system may be referred to as a "charge-discharge system", since this discharge system has a function of a "charge-system, which can charge the vehicle electric storage section using an electric power supplied from an external power supply (which may include the external electric storage device)." Further, the vehicle electric storage section may include a "vehicle (on-board) electric storage device which is mounted on the vehicle and can be charged with (using) an electric power supplied from the external power supply (and a generator mounted on the vehicle)" and a "generator (electric power generating apparatus) which is mounted on the vehicle and generates an electric power to charge the vehicle electric storage section", or may include the vehicle electric storage device only.

(Outline of Structure)

Figure 1:
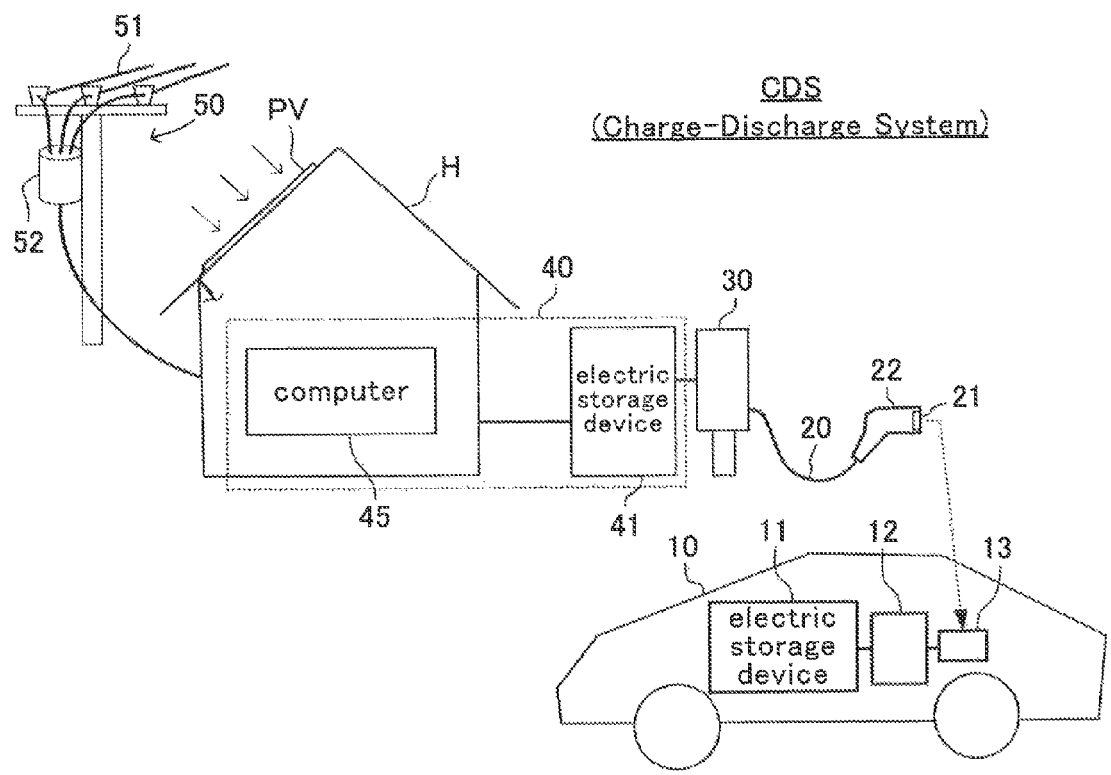
FIG. 1 is a schematic view of a charge-discharge system according to an embodiment of the present invention.

As shown in FIG. 1, the charge-discharge system CDS is configured to include a vehicle 10, an electric power cable 20, a plug-in station 30, a HEMS 40, and a commercial power supply 50.

The vehicle 10 includes an electric storage device 11, control device 12, and an inlet 13.

The electric storage device 11 is an electric power storage component, which can be charged and discharged (rechargeable-dischargeable). The electric storage device 11 is therefore capable of being charged with (or using) an electric power supplied from an external power supply. The electric storage device 11 is capable of supplying electric power to an external electric load by being discharged. The electric storage device 11 is a lithium-ion battery, in the present example. The electric storage device 11 can be a secondary battery other than the lithium-ion battery, such as a nickel hydride battery and a lead battery, and also be a storage component which is rechargeable-and-dischargeable. The electric storage device 11 may be referred to as a "vehicle (on-board) electric storage device 11" to be distinguished from an electric storage device external to (or outside of) the vehicle.

As described later in detail, the control device 12 is an electric circuit, including a plurality of electronic control units (ECU) each of which includes a microcomputer, various sensors, a DC/AC inverter, an AC/DC converter, relays, and so on. The control device 12 controls charge of the electric storage device 11 with (or using) the electric power supplied from the external power supply and discharge of (from) the electric storage device 11 by supplying the electric power to the external electric load (i.e., it controls charge and discharge of the electric storage device 11). The control of the charge-and-discharge means a control of an electric power or the like relating to the charge-and-discharge, such as start or stop of the charge, start or stop of the discharge, prohibition of the charge when a charge current is excessive, and prohibition of the discharge when a discharge current is excessive. The control device 12 may be referred to as a "vehicle (on-board) control device 12" to be distinguished from a control device external to (or outside of) the vehicle.

The inlet 13 is configured so as to be capable of being connected with a connector 21 which is provided at one of ends of the electric power cable 20. The configurations including shapes and arrangements of end terminals of the inlet 13 and the connector 21 are compliant with (in conformity to) the standards, such as the above described document No. 1 and the above described document No. 2. It should be noted that standards of the documents No. 1 and No. 2 are the standards that are applied when the charge of the electric storage device 11 using the external power supply is carried out. In contrast, the charge-discharge system according to the present embodiment performs not only charging but also discharging. Nevertheless, the configurations including the shapes and arrangements of the end terminals of the inlet 13 and the connector 21 are compliant with (in conformity to) those standards. Accordingly, the inlet 13 can be connected with an unillustrated power charge cable having a conventional connector (connector for charge) which is in conformity to those known standards.

It should be noted that, in the present example, the vehicle 10 is a hybrid vehicle comprising an internal combustion engine and a motor-generator as vehicle drive sources. However, as long as the vehicle 10 is a vehicle which utilizes the electric power from the electric storage device 11, the structure of the vehicle is not limited. Accordingly, the vehicle 10 may be a vehicle mounting the electric storage device 11 and having an internal combustion engine only as the vehicle drive source, a fuel-cell vehicle, an electric vehicle, or the like.

The electric power cable (power cable) 20 comprises an operating portion 22 at one of the ends. The connector 21 is provided at a tip of the operating portion 22. The other one of the ends of the power cable 20 is connected with the plug-in station 30. The power cable 20 is used during both charging and discharging of the electric storage device 11.

The plug-in station 30 is located in the vicinity of a house H. As described later in detail, the plug-in station 30 includes a communication unit, a relay which selects either one of power charge lines (power lines for charging) and power discharge lines (power lines for discharging), a CPLT circuit (CPLT signal generation circuit), and so on. The plug-in station 30 is connected to the HEMS 40 through electric power lines including power charge lines and the power discharge lines, and the signal lines.

The HEMS 40 is a home energy management system. As described later in detail, the HEMS 40 in the present example includes an electric storage device external to (or outside of) the vehicle (hereinafter referred to as an "external electric storage device") 41, a computer 45, an AC/DC converter 42, a DC/AC inverter 43, a short-circuit protection circuit 44, and the like (refer to FIG. 5).

The external electric storage device 41 is configured so as to be capable of being charged and discharged. The external electric storage device 41 is a lead battery in the present example, however, the device 41 may be another type of secondary battery or the like as long as it is a rechargeable-and-dischargeable component. The external electric storage device 41 is connected with the plug-in station 30 through electric power lines. The external electric storage device 41 is configured so as to be charged using the electric power supplied from the vehicle electric storage device 11. Further, the external electric storage device 41 is also a power source for an electric power used in the house H as a home electric power.

The commercial power supply 50 includes a transformer 52 which converts a high voltage (e.g., 6600 V) electric power transmitted through electric power transmission lines 51 from a power plant and the like into a low voltage (e.g., 100 V or 200 V) electric power. The electric power supplied from the commercial power supply 50 is used as the home electric power in the home H, and is further supplied to the external electric storage device 41 through the HEMS 40 so as to charge the external electric storage device 41.

It should be noted that, in the present example, a photo voltaic system including solar battery panels PV is provided to the house H. An electric power generated by the photo voltaic system can be used as the home electric power, and can be used to charge the external electric storage device 41, similarly to the electric power from the commercial power supply 50.

In the thus configured charge-discharge system, the vehicle electric storage device 11 can be charged using the external power supply, and can supply the electric power from the vehicle electric storage device 11 to the external electric load, in a state in which the connector 21 of the power cable 20 is connected with the inlet 13 of the vehicle 10. It should be noted that the external power supply includes the external electric storage device 41, the commercial power supply 50, the photo voltaic system, and the like. The external electric load includes the external electric storage device 41, electric home appliances, and the like, used in the house H.

Details of the charge-discharge system will next be described. It should be noted that each component which is the same as the component which has been already described is given the same numeral as one given to such a component.

Figure 2:
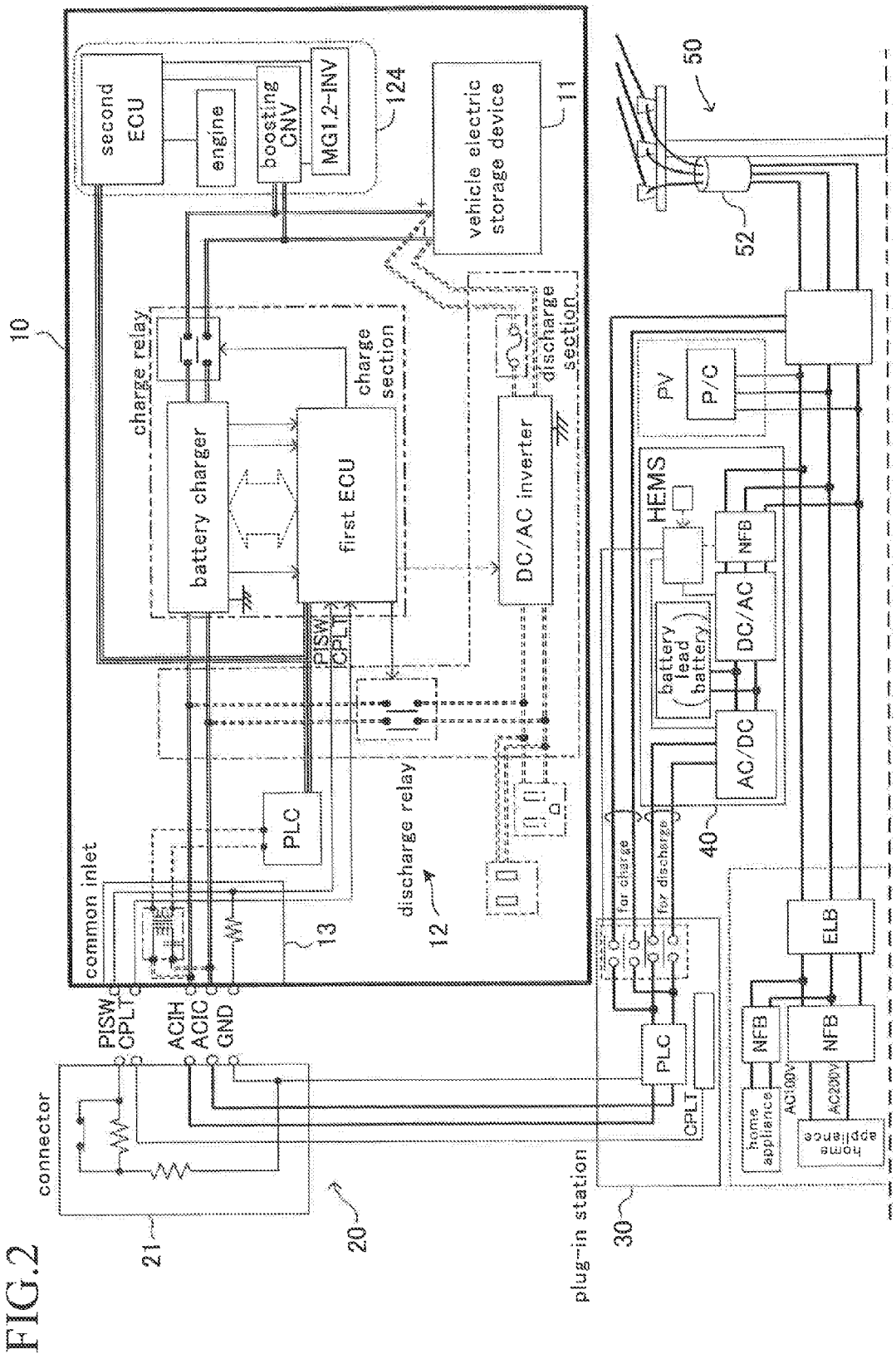
FIG. 2 is a schematic circuit diagram of the charge-discharge system shown in FIG. 1.
Figure 3:
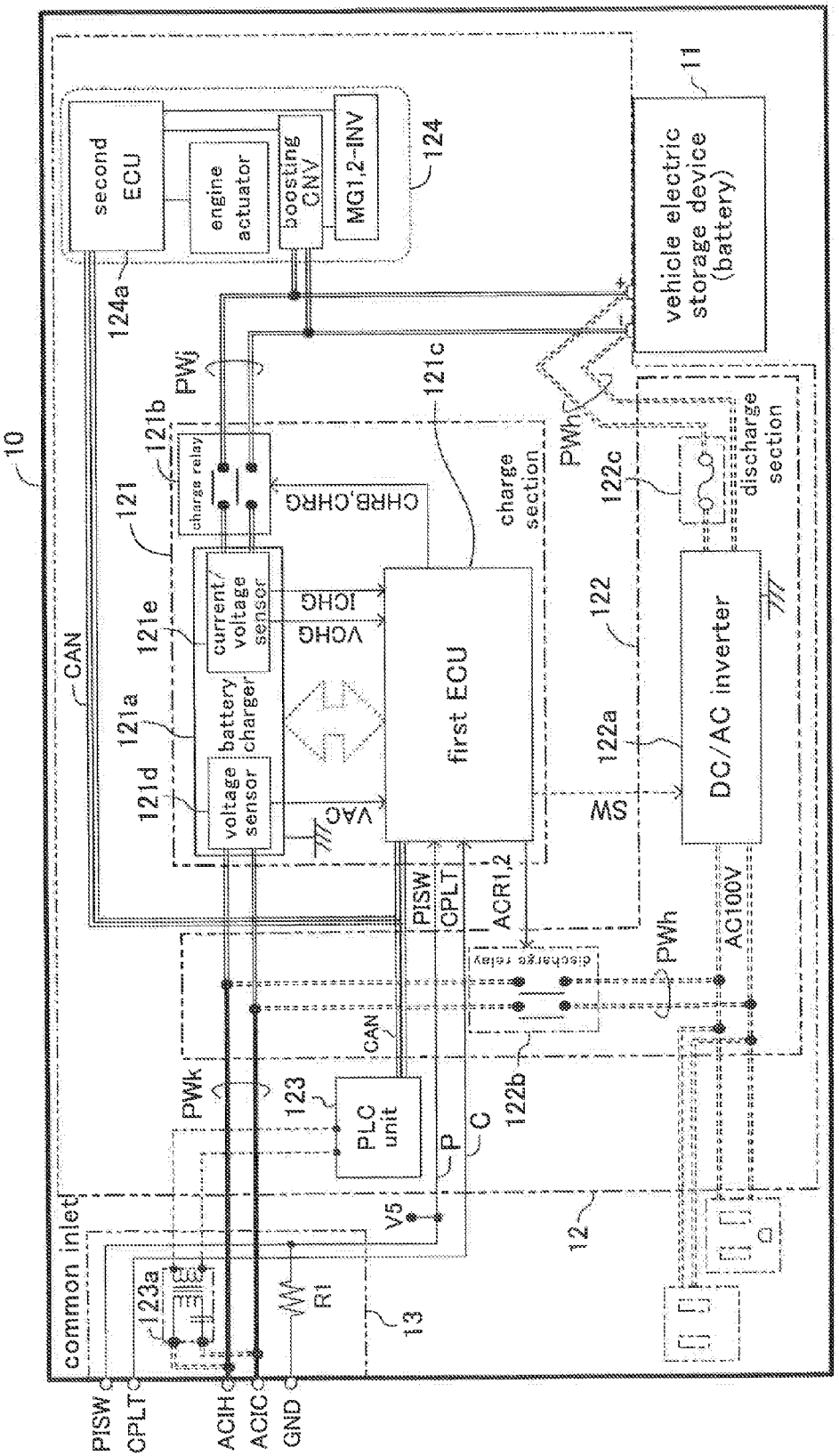
FIG. 3 is a schematic enlarged circuit diagram of the control device and the inlet, shown in FIG. 2, included in the vehicle.

As shown in FIG. 2 which shows an overall view and in FIG. 3 which shows an enlarged view, the vehicle 10 includes the vehicle electric storage device 11, the control device 12, and the inlet 13, as described above. Further, the vehicle 10 includes a pair of power lines (charge-and-discharge common power lines) PWk shown by bold solid lines in FIG. 3, a pair of power lines (charge power lines) PWj shown by double solid lines in FIG. 3, and a pair of power lines (discharge power lines) PWh shown by double broken lines in FIG. 3.

The control device 12 includes a charge section 121, a discharge section 122, a PLC unit 123, and a vehicle control section 124.

The charge section 121 includes a battery charger 121a, a charge relay 121b, and a first electronic control unit 121c.

The battery charger 121a is connected with a pair of alternate current input-output terminals ACIH, ACIC of the inlet 13 through (via) the charge-and-discharge common power lines PWk and the charge power lines PWj. The battery charger 121a includes an unillustrated boosting transformer and an unillustrated AC/DC converter, and is configured so as to convert an AC power between the alternate current input-output terminals ACIH and ACIC into a DC power so that the battery charger 121a outputs the converted DC power to each of input terminals of the charge relay 121b.

The battery charger 121a includes a voltage sensor 121d and a current/voltage sensor 121e. The voltage sensor 121d measures a voltage VAC of the AC power which is input to the battery charger 121a, and outputs the voltage VAC to the first electronic control unit 121c. The current/voltage sensor 121e measures a current ICHG and a voltage VCHG of the DC power which is output between input terminals of the charge relay 121b, and output them to the first electronic control unit 121c. The battery charger 121a receives control signals from the first electronic control unit 121c, and converts, in response to (based on) the control signals, the AC power into the DC power which is to be supplied to the vehicle electric storage device 11.

The charge relay 121b is provided on (inserted into) the charge power lines PWj between the battery charger 121a and the vehicle electric storage device 11. The charge relay 121b opens its relay contacts in response to (based on) the control signal CHRB from the first electronic control unit 121c, and closes the relay contacts in response to (based on) the control signal CHRG from the first electronic control unit 121c. When the relay contacts of the charge relay 121b are opened, charging the vehicle electric storage device 11 (supplying the electric power to the vehicle electric storage device 11) is stopped. When the relay contacts of the charge relay 121b are closed, the vehicle electric storage device 11 is charged.

The first electronic control unit (first ECU) 121c is connected with a PISW terminal of the inlet 13 through (via) a connection line P. It should be noted that a constant voltage V5 is applied to the connection line P.

The connection line P is connected with a GND terminal connected to a ground point in the vehicle through (via) a resistor R1. The first electronic control unit 121c is connected with a CPLT terminal of the inlet 13 through (via) a connection line C. An unillustrated resistor is connected to the connection line C so as to lower (decrease) a voltage at the CPLT terminal from V1 to V2 when the connector 21 is made connected with the inlet 13. The first electronic control unit 121c is connected with the PLC unit 123 and a second electronic control device 124a through (via) a communication line of a CAN (control area network).

The first electronic control unit 121c is configured so as to send a control signal SW to a DC/AC inverter 122a of the discharge section 122 described later. Further, the first electronic control unit 121c is configured so as to send control signals ACR1, ACR2 to a discharge relay (relay for discharge) 122b of the discharge section 122 described later.

The discharge section 122 includes a DC/AC inverter 122a, the discharge relay 122b, and a fuse 122c.

The DC/AC inverter 122a is connected with a positive electrode and a negative electrode of the vehicle electric storage device 11 through (via) the discharge power lines PWh. The DC/AC inverter 122a is configured so as to convert a DC power between the positive electrode and the negative electrode of the vehicle electric storage device 11 into an AC power (e.g., AC 100 V or AC 200 V) so that the DC/AC inverter 122a outputs the converted AC power to each of input terminals of the discharge relay 122b. The fuse 122c is provided to (inserted in) the discharge power line PWh between the DC/AC inverter 122a and the positive electrode of the vehicle electric storage device 11.

The discharge relay 122b is provided on (inserted in) the discharge power lines PWh in series, the lines PWh connecting between the charge-and-discharge common power lines PWk and output terminals of the DC/AC inverter 122a. The discharge relay 122b opens its relay contacts in response to a control signal ACR1 from the first electronic control unit 121c, and closes the relay contacts in response to a control signal ACR2 from the first electronic control unit 121c. When the relay contacts of the discharge relay 122b are opened, discharging the vehicle electric storage device 11 (supplying the electric power to the external electric load) is stopped. When the relay contacts of the discharge relay 122b are closed, the discharge of (from) the vehicle electric storage device 11 is carried out.

The PLC unit 123 is a unit carrying out a power line communication. That is, the PLC unit 123 is a unit which exchanges information using communication signals transmitted through (via) the power lines. The PLC unit 123 is also referred to as a "second communication unit 123" or a "on-board communication unit 123", for convenience. The PLC unit 123 is connected with a pair of the alternate current input-output terminals ACIH and ACIC of the inlet 13 through (via) a transformer (voltage transformer) 123a. This allows the PCL unit 123 to receive the communication signals transmitted to a pair of the alternate current input-output terminals ACIH and ACIC. The PLC unit 123 is configured so as to send the received communication signals to the first electronic control unit 121c. Further, the PCL unit 123 is configured so as to send, in response to (based on) an instruction from the first electronic control unit 121c, communication signals which convey certain information to a pair of the alternate current input-output terminals ACIH and ACIC.

The vehicle control section 124 (second ECU) includes the second electronic control device 124a, engine actuators, a boosting converter, an inverter for a first motor generator, and an inverter for a second motor generator. The second electronic control unit 124a can vary an output power of an unillustrated internal combustion engine by controlling the engine actuators, such as fuel injectors, and an throttle valve actuator. The second electronic control device 124a can control an output torque and a rotational speed of each of the first motor generator and the second motor generator, by controlling the boosting converter, the inverter for the first motor generator, and the inverter for the second motor generator. Accordingly, the second electronic control device 124a can generate a driving force for the vehicle 10 from the internal combustion engine and the second motor generator while operating the internal combustion engine at a maximum efficiency. Further, the second electronic control device 124a can charge the vehicle electric storage device 11 by driving the first motor generator and the like using the engine. Details of those controls are described in, for example, Japanese Patent Application Laid-Open (kokai) Nos. 2009-126450 (United State Patent publication US2010/0241297), and Japanese Patent Application Laid-Open (kokai) No. H9-308012 (U.S. Pat. No. 6,131,680, filed on Mar. 10 1997). Those are incorporated by reference in the present specification. In addition, the second electronic control device 124a can generate an electric power using the first motor generator and so on in response to (based on) the signal (request signal for power generation) obtained through the CAN from the first electronic control unit 121c, and can supply the generated electric power to the external electric load through (via) the discharge section 122, the inlet 13, and so on, even while the vehicle 10 is stopped.

The inlet 13 is provided at a side panel or the like of the vehicle 10. As described above, the inlet 13 has the shape that allows the connector 21 of the power cable 20 to be connected with the inlet 13. The inlet 13 includes the PISW terminal (receiving side PISW terminal, inlet side PISW terminal), the CPLT terminal (receiving side CPLT terminal, inlet side CPLT terminal), the ACIH terminal (inlet side ACIH terminal), the ACIC terminal (inlet side ACIC terminal), and the GND terminal (inlet side GND terminal).

Figure 4:
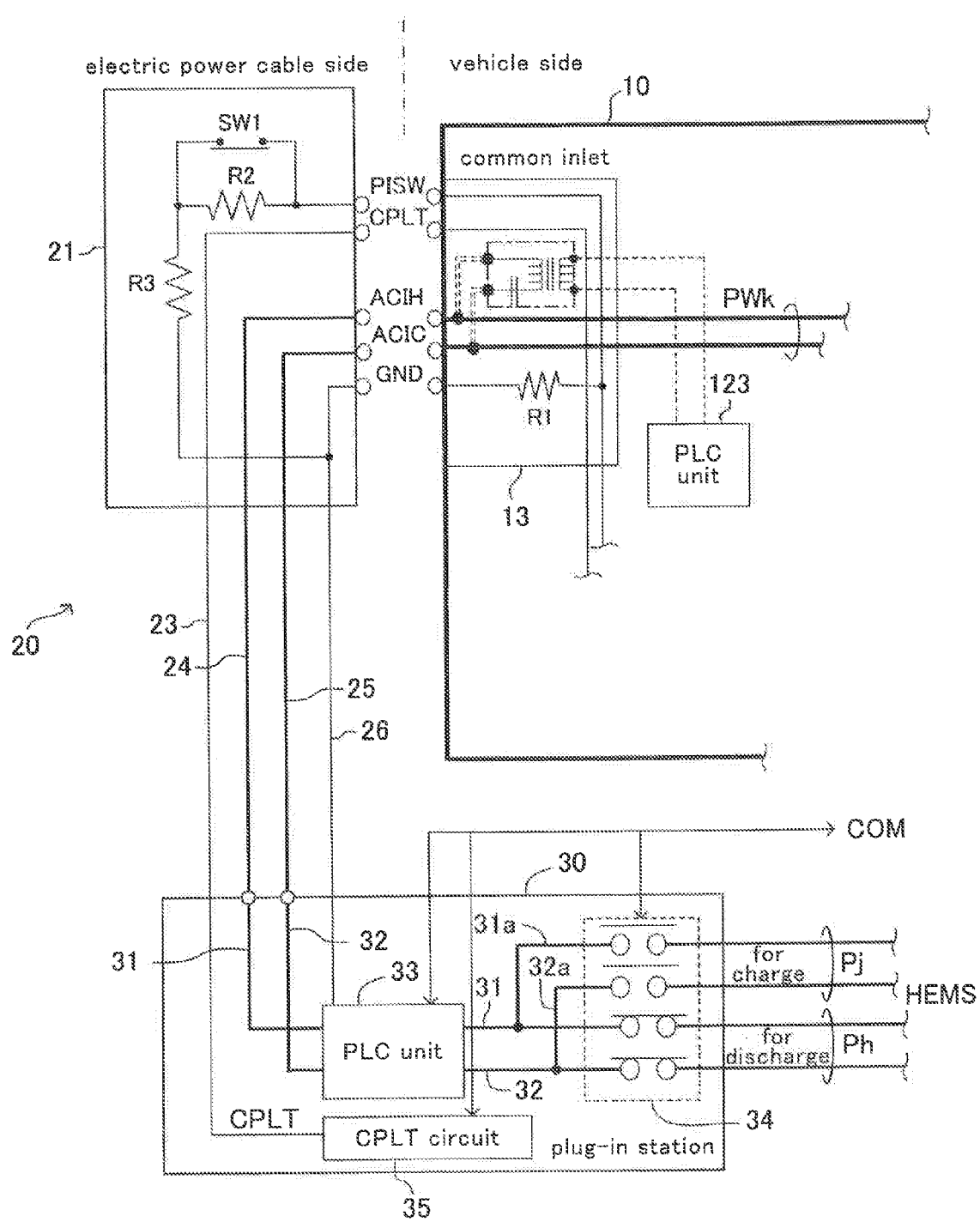
FIG. 4 is a schematic enlarged circuit diagram of the electric power cable and the plug-in station, shown in FIG. 2.

As shown in FIG. 2 which shows the overall view and in FIG. 4 which shows an enlarged view, the power cable 20 includes the connector 21, a control pilot line (CPLT signal line) 23, a pair of power lines 24, 25, and a grounding line (wire) 26.

The connector 21 is connected with each one of ends of the control pilot line (CPLT signal line) 23, a pair of the power lines 24, 25, and the grounding line 26 (i.e., one of the ends of the power cable). The connector 21 includes the PISW terminal (sending side PISW terminal, cable side PISW terminal), the CPLT terminal (sending side CPLT terminal, cable side CPLT terminal, specific terminal), the ACIH terminal (cable side ACIH terminal), the ACIC terminal (cable side ACIC terminal), and the GND terminal (cable side GND terminal).

When the connector 21 is physically connected with the inlet 13, the sending side PISW terminal of the connector 21 is physically and electrically connected with the receiving side PISW terminal of the inlet 13, the sending side CPLT terminal of the connector 21 is physically and electrically connected with the receiving side CPLT terminal of the inlet 13, the cable side ACIH terminal of the connector 21 is physically and electrically connected with the inlet side ACIH terminal of the inlet 13, the cable side ACIC terminal of the connector 21 is physically and electrically connected with the inlet side ACIH terminal of the inlet 13, and the cable side GND terminal of the connector 21 is physically and electrically connected with the inlet side GND terminal of the inlet 13.

A resistance circuit formed of a resistor R2 and a resistor R3 connected with each other in series is connected between the sending side PISW terminal of the connector 21 and the sending side (cable side) GND terminal of the connector 21.

The connector 21 further includes a switch SW1. The switch SW1 is configured so as to open and close in accordance with a fitting state between the connector 21 and the inlet 13, when convex portions of a locking mechanism of the connector 21 frts with corresponding concave portions of the inlet 13. Specifically, the switch SW1 is configured so as to be closed, when the connector 21 and the inlet 13 have not been fitted with each other (i.e., in the non-fitting state). The switch SW1 is configured so as to be opened, when the connector 21 and the inlet 13 are incompletely fitted with each other so that each of the terminals of the connector 21 and the each of the terminals of the inlet 13 are electrically connected with each other, but the connector 21 and the inlet 13 are not completely fitted with each other (i.e., in the incomplete fitting state). Further, the switch SW1 is configured so as to be closed again, when the connector 21 and the inlet 13 are completely fitted with each other so that each of the terminals of the connector 21 and the each of the terminals of the inlet 13 are electrically connected with each other (i.e., in the complete fitting state).

The control pilot line 23 is connected to the CPLT terminal (sending side CPLT terminal).

The power line 24 is connected to the ACIH terminal (cable side ACIH terminal).

The power line 25 is connected to the ACIC terminal (cable side ACIC terminal).

The grounding wire 26 is connected to the GND terminal (cable side GND terminal).

The plug-in station 30 includes power lines 31, 32, a PLC unit 33, diverged power lines 31a, 32a, a charge-discharge switching relay 34, and a CPLT circuit 35.

The power line 31 is connected with the power line 24 of the power cable 20 and with one of a pair of discharge relays of the charge-discharge switching relay 34.

The power line 32 is connected with the power line 25 of the power cable 20 and with the other one of a pair of the discharge relays of the charge-discharge switching relay 34.

The PLC unit 33 is a unit carrying out the power line communication, similarly to the PCL unit 123. The PLC unit 33 is provided on (inserted into) the power line 31 and the power line 32 (so as to be capable of providing communication signals to the power line 31 and the power line 32). The PLC unit 33 is configured so as to be able to communicate with a computer 45 of the HEMS 40 described later (refer to FIG. 5). The PLC unit 33 can send, in response to an instruction from the computer 45 of the HEMS 40, communication signals which convey certain information to the ACIH terminal (cable side AICH terminal) and the ACIC terminal (cable side ACIC terminal) of the connector 21 through (via) the power lines 31, 24 and the power lines 32, 25. Further, as described above, the PLC unit 123 of the vehicle 10 can send the communication signals which convey certain information to a pair of the alternate current input-output terminals ACIH and ACIC. Accordingly, the PCL unit 33 and the PLC unit 123 can exchange information using the communication signals according to a predetermined protocol. It should be noted that the PLC unit 33 may also be referred to as a "first communication unit 33" or an "external vehicle (off-board) communication unit 33."

The power line 31 diverges at a position between the PLC unit 33 and the charge-discharge switching relay 34. The diverged power line 31a from the power line 31 is connected to one of a pair of charge relays of the charge-discharge switching relay 34.

The power line 32 diverges at a position between the PLC unit 33 and the charge-discharge switching relay 34. The diverged power line 32a from the power line 32 is connected to the other one of a pair of the charge relays of the charge-discharge switching relay 34.

A pair of the discharge relays of the charge-discharge switching relay 34 are connected with a pair of discharge power lines Ph (power lines Ph used for discharge) connected to the HEMS 40, as described later.

A pair of the charge relays of the charge-discharge switching relay 34 are connected with a pair of charge power lines Pj (power lines Pj used for charge) connected to the HEMS 40, as described later.

The charge-discharge switching relay 34 works (operates) in response to a switching signal sent form the computer 45 of the HEMS 40. When a pair of the discharge relays of the charge-discharge switching relay 34 close their contacts, a pair of the charge relays of the charge-discharge switching relay 34 open their contacts. In contrast, when a pair of the discharge relays of the charge-discharge switching relay 34 open their contacts, a pair of the charge relays of the charge-discharge switching relay 34 close their contacts. Further, the charge-discharge switching relay 34 is maintained at a state where all of its contacts are opened, when neither the charge nor the discharge is carried out.

The CPLT circuit 35 is configured so as to provide (send) the control pilot signal having a constant voltage or a duty cycle (duty ratio) described later to the CPLT terminal (sending side CPLT terminal) of the connector 21 through (via) the control pilot line 23. It should be noted that the voltage generated by the CPLT circuit 35 is equal to V1 (e.g. 12 V). Accordingly, a voltage of a pulse of the duty signal generated by the CPLT circuit 35 is also equal to V1. The CPLT circuit 35 is configured so as to be capable of communicating with the computer 45 of the HEMS 40, so that it can send (provide) a permissible current value (value of an allowable current, current rating, rated ampacity) to the computer 45 of the HEMS 40.

Figure 5:
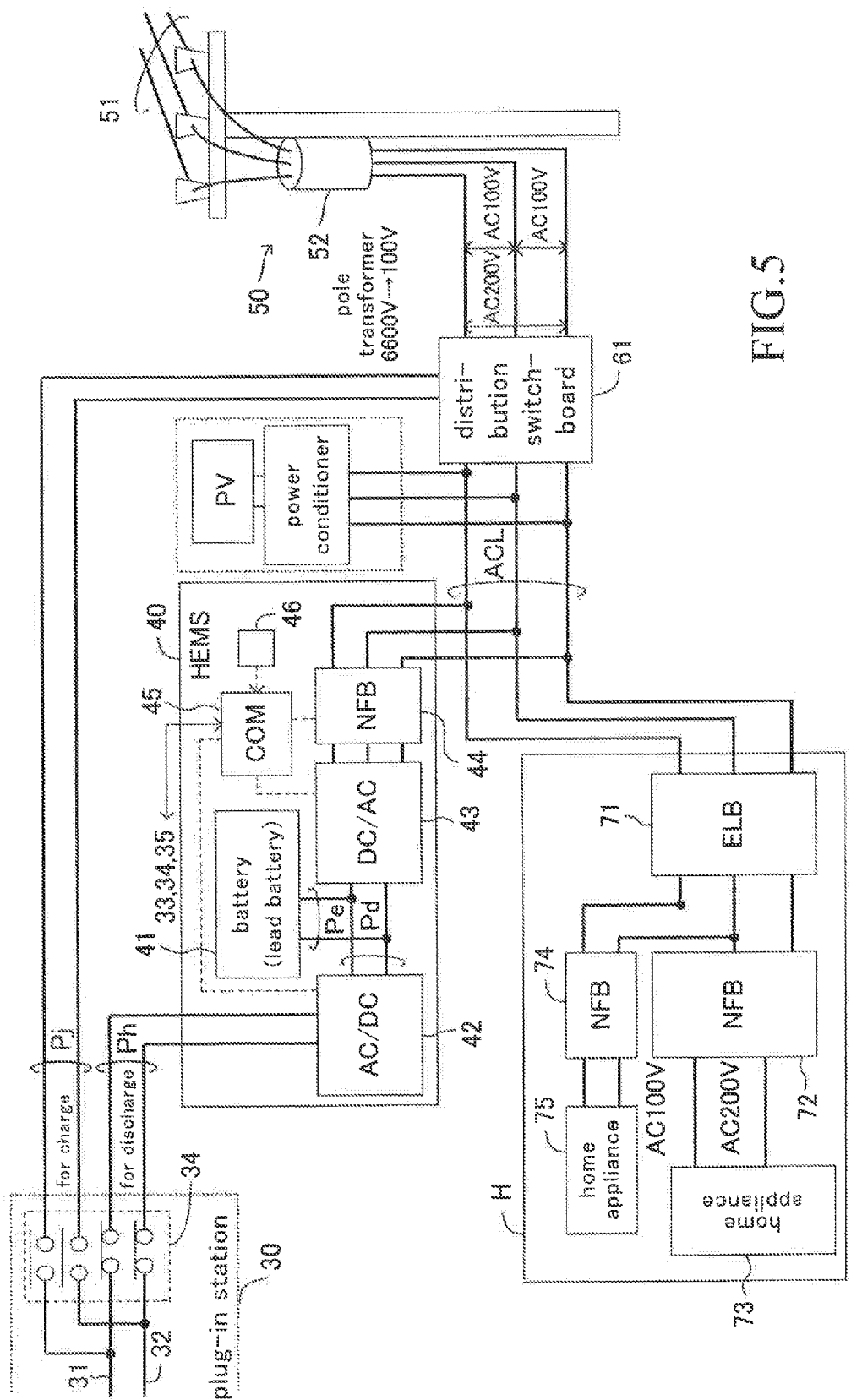
FIG. 5 is a schematic enlarged circuit diagram of the HEMS and the external power supply, shown in FIG. 2.

As shown in FIG. 2 which shows the overall view and in FIG. 5 which shows an enlarged view, the HEMS 40 includes the external electric storage device 41, the AC/DC converter 42, the DC/AC inverter 43, the short-circuit protection circuit (NFB) 44, the computer 45, and the input device 46.

As described above, the external electric storage device 41 is the secondary battery (lead battery, in the present example) which can be charged using the electric power supplied from the commercial power supply 50 and the electric power supplied from the vehicle electric storage device 11.

The AC/DC converter 42 is connected with a pair of the discharge power lines Ph connected to the charge-discharge switching relay 34 of the plug-in station 30.

The DC/AC inverter 43 is connected with the AC/DC converter 42 through (via) power lines Pd.

The short-circuit protection circuit (NFB) 44 is inserted between the DC/AC inverter 43 and power lines ACL which transmit an AC power supplied from the external power supply 50 through (via) a distribution switchboard 61.

The computer 45 is connected with the AC/DC converter 42, the DC/AC inverter 43, and the short-circuit protection circuit (NFB) 44, and sends the instruction signals to them or monitors their operation states.

The computer 45 is further configured so as to store information which is input by the user through the input device 46.

The house H is configured so as to supply the electric power (AC 200V) on the power lines ACL to the electric home appliance 73 through, for example, an earth leakage breaker (ELB) 71 and a short-circuit protection circuit (NFB) 72, and so as to supply the electric power (AC 100V) on the power lines ACL to the electric home appliance 75 through the earth leakage breaker 71 and a short-circuit protection circuit 74.

The distribution switchboard 61 is configured so as to output the low voltage electric power supplied from the commercial power supply 50 through the transformer 52 onto the power lines ACL. Further, the distribution switchboard 61 is configured so as to output the low voltage electric power supplied from the commercial power supply 50 through the transformer 52 onto the charge power lines Pj connected to the charge-discharge switching relay 34.

Operations (charging sequence and discharging sequence) of the thus configured charge-discharge system CDS will next be described. It should be noted that operations performed by the HEMS 40 are realized by executing processes by the computer 45, and operations performed by the vehicle 10 are realized by executing processes by the CPU of the first electronic control unit 121c.

<Discharging Sequence Using Communication>

The discharging sequence using the HEMS 40 will next be described with reference to FIGS. 6 to 8. The HEMS 40 discharges the electric storage device 11 using the communication (communication signals) between the PLC unit 33 which is the communication unit and the PLC unit 123 which is the communication unit of the vehicle 10. This type of discharge is also referred to as a "discharge (discharging) using communication", hereinafter.

Firstly, the user connects the connector 21 of the power cable 20 to the inlet 13 of the vehicle 10. As described above, the switch SW1 is closed when the connector 21 and the inlet 13 have not been fitted with each other (i.e., in the non-fitting state), is opened when the connector 21 and the inlet 13 are incompletely fitted with each other (i.e., in the incomplete fitting state), and is closed again when the connector 21 and the inlet 13 are completely fitted with each other (i.e., in the complete fitting state).

When the resistance values of the resistor R1, R2, and R3 are R1, R2, and R3 ($\Omega$), respectively, the resistance value between the PISW terminal and the GND terminal is equal to Rn=R1 ($\Omega$) in the non-fitting state, is equal to Rh=R1·(R2+R3)/(R1+R2+R3) ($\Omega$) in the incomplete fitting state, and is equal to Rf=R1·R3/(R1+R3) ($\Omega$) in the complete fitting state. Accordingly, if the R1, R2, and R3 are appropriately set, the resistance value between the PISW terminal and the GND terminal lowers/decreases in a stepwise fashion from Rn to Rh, and then to Rf, as the fitting state between the connector 21 and the inlet 13 proceeds from the non fitting state to the incomplete fitting state, and then to the complete fitting state. Therefore, the resistance value between the PISW terminal and the GND terminal becomes the lowest (minimum) value Rf when the connector 21 and the inlet 13 are completely connected with each other.

Meanwhile, when the connector 21 and the inlet 13 are not connected with each other, the CPLT circuit 35 generates the constant voltage (non-oscillation) V1 (e.g., V1=12 V). That is, the control pilot signal (CPLT signal) is equal to V1 which is constant. When the connector 21 and the inlet 13 are completely connected with each other, the voltage (potential) at the receiving side CPLT terminal lowers/decreases to V2 (e.g., 9 V) smaller than V1 owing to an unillustrated resistor provided in the inlet 13 (refer to step S1 in FIG. 6).

It should be noted that the first electronic control unit 121c which is in the sleep state may lowers the voltage of the CPLT signal from V1 down to V2. In addition, the control device 12 may include a circuit, which is provided separately from the first electronic control unit 121c and is always supplied with the electric power from the vehicle electric storage device 11, and the circuit may detect a change in the resistance value between the PISW terminal and the GND terminal and may lowers/decreases the voltage of the control pilot signal (CPLT signal) from V1 down to V2.

Figure 6:
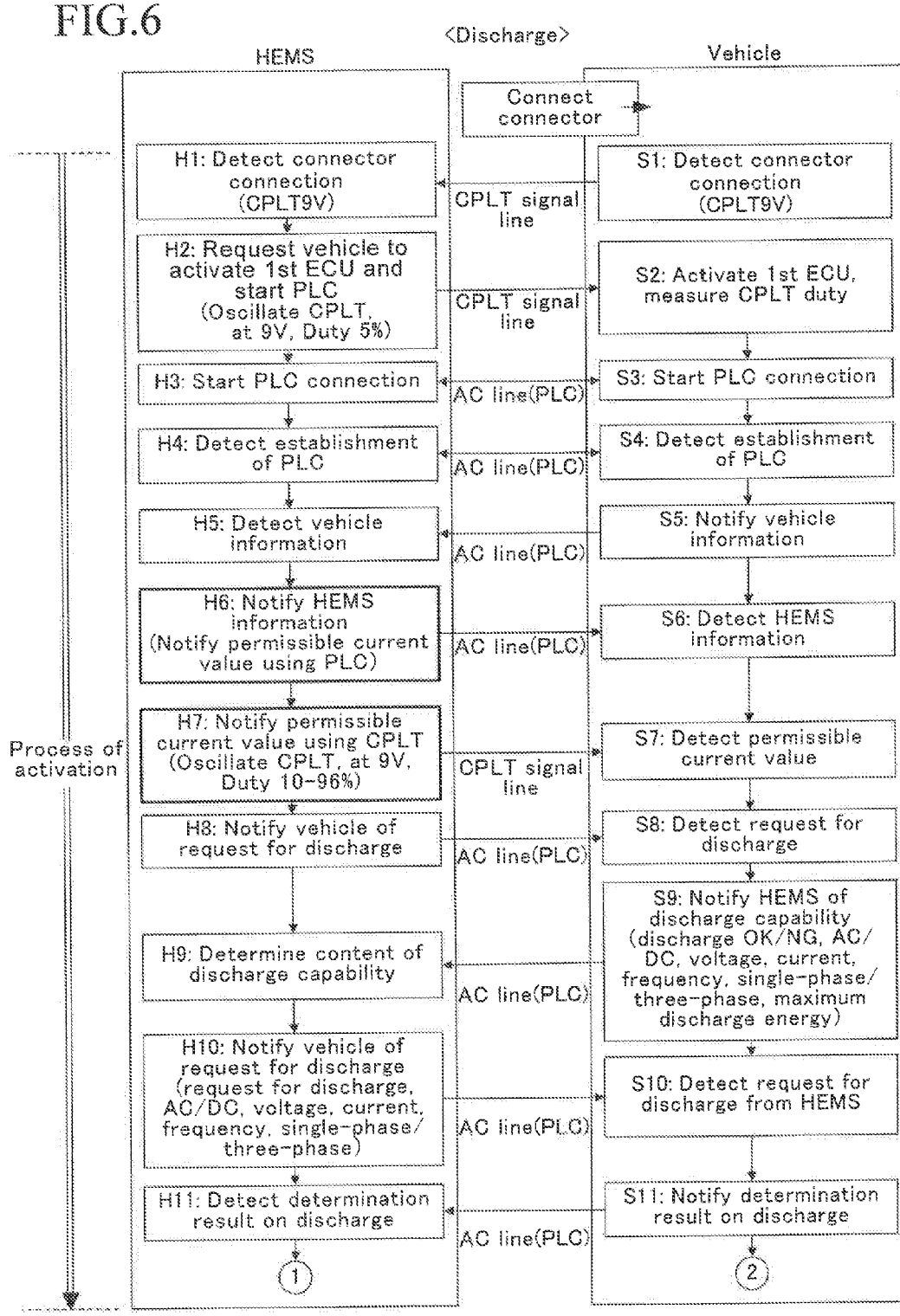
FIG. 6 is a process chart during discharging operation of the charge-discharge system shown in FIG. 2.

After the HEMS 40 confirms that the potential (voltage) of the CPLT signal line 23 becomes V2 at step H1 of FIG. 6, the HEMS 40 oscillates the CPLT signal to have a duty cycle 5% at step H2. Having the duty cycle of the CPLT signal be equal to 5% means sending to the vehicle 10 a "request for starting the PLC communication and a vehicle activating request (first electronic control unit activating request)." It should be noted that the standard defines that, when the duty cycle of the CPLT signal is within 10% to 96%, the duty cycle indicates that there is/arises a "usual request for charge without using the communication, which is different from the charge-discharge owing to the communication of the HEMS 40, and so on." Further, the standard defines that, when the duty cycle of the CPLT signal is within 10% to 96%, the duty cycle indicates a "permissible current value (current rating) of a power charge cable connected with the inlet 13." That is, according to the standards, in the case in which the duty cycle of the CPLT signal is within 10% to 96%, the duty cycle has a predetermined relation with the permissible current value of the power charge cable.

The vehicle 10 activates the first electronic control unit 121c at step S2 to measure the duty cycle of the CPLT signal. It should be noted that the first electronic control unit 121c (or the CPU) is activated when an interrupt processing is activated by an rising edge of the CPLT signal which is oscillating at a predetermined duty cycle. The process at this point in time corresponds to step 200 shown in FIG. 7. FIG. 7 is a flowchart showing operating procedures executed by the vehicle 10 (CPU of the first electronic control device 12). After the vehicle 10 measures the duty cycle, the vehicle 10 proceeds to step 205 shown in FIG. 7, at which the vehicle 10 determines whether or not the measured duty cycle of the CPLT signal is 5%. At the present point in time, the CPLT signal having the 5% duty cycle is being sent from the HEMS 40. Accordingly, the vehicle 10 make a "Yes" determination at step 205 to proceed to step 210, at which the vehicle 10 establishes a PLC connection (makes a preparation to enable the communication using the power line communication) (refer to step S3 in FIG. 6). That is, the vehicle 10 establishes a communication enabled state between the PLC unit (second communication unit) 123 of the vehicle 10 and the PLC unit (first communication unit) 33 of the plug-in station 30.

Figure 7:
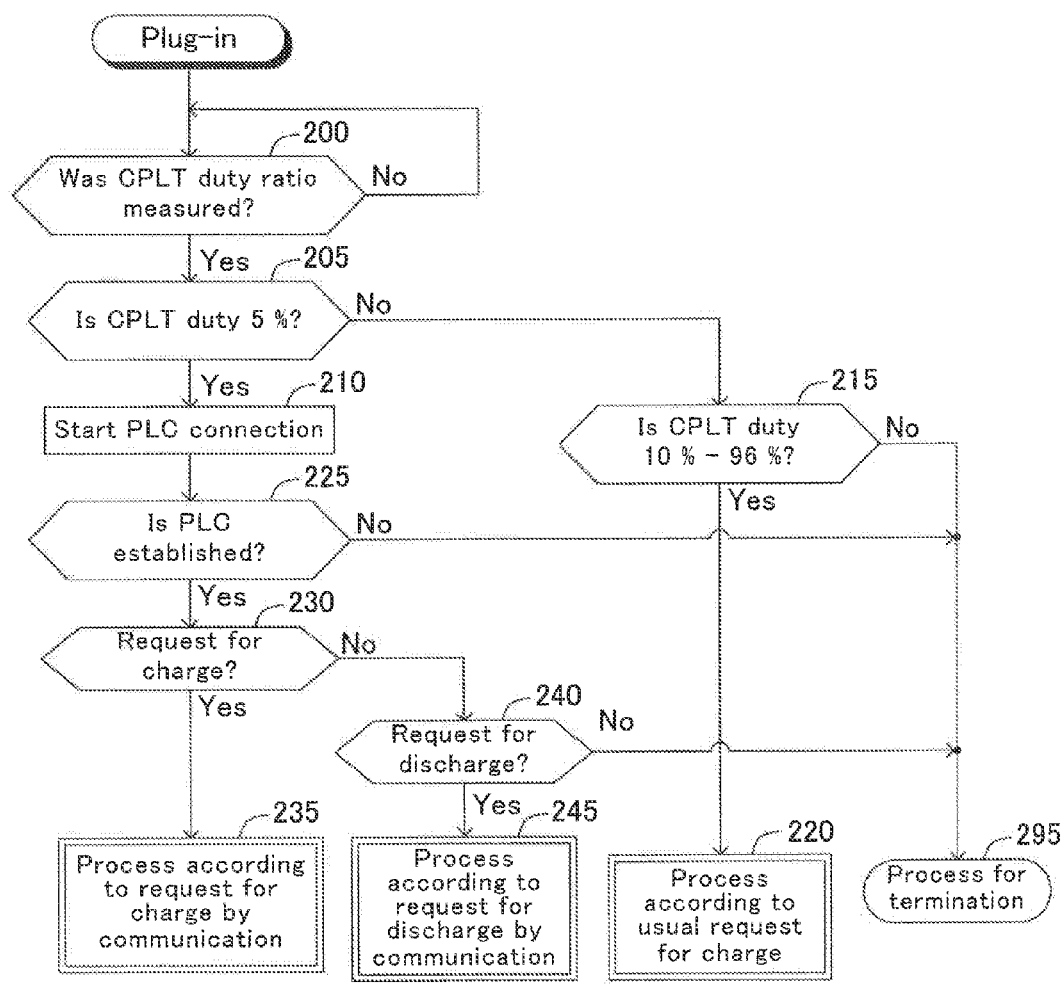
FIG. 7 is a flowchart showing a routine executed by a CPU of the first electronic control unit shown in FIG. 2.

It should be noted that, if the duty cycle of the CPLT signal is not 5% when the vehicle 10 executes the process of step 205 shown in FIG. 7, the vehicle makes a "No" determination at step 205 to proceed to step 215, at which it determines whether or not the duty cycle of the CPLT signal is within 10 to 96%. That is, the vehicle 10 determines whether or not the request for charge according to the standard (i.e., request for charge without using the communication) has been generated.

At this point in time, if the duty cycle of the CPLT signal is within 10% to 96%, the vehicle 10 makes a "Yes" determination at step 215 to proceed to step 220, at which it starts a charge process based on the usual request for charge. In this case, the vehicle 10 obtains, based on the duty cycle of the CPLT signal, the permissible current value of the power charge cable connected with the inlet 13 (in conformity to the known standard), and uses the "obtained permissible current value of the power charge cable" for a control for charging based on the usual request for charge at step 220.

Further, if the duty cycle of the CPLT signal is not within 10% to 96% when the vehicle 10 executes the process of step 215 shown in FIG. 7, the vehicle 10 proceeds to step 295 to end the process.

When the vehicle 10 proceeds to step 210 shown in FIG. 7, in other words, when the vehicle 10 proceeds to step S3 shown in FIG. 6, the HEMS 40 also starts to establish the PLC connection, as shown in step H3 in FIG. 6. Thereafter, the HEMS 40 detects an establishment of the PLC communication at step H4. Similarly, the vehicle 10 detects the establishment of the PLC communication at step S4 shown in FIG. 6. This process corresponds to a "Yes" determination at step 225 shown in FIG. 7.

For example, if the vehicle 10 can not confirm the establishment of the PLC communication within a certain time, the vehicle 10 makes a "No" determination at step 225 shown in FIG. 7 to proceed step 295, at which it ends the present process tentatively. In this case, the oscillation of the CPLT signal is stopped.

In a case in which both the vehicle 10 and the HEMS 40 have detected the establishment of the PLC communication, the vehicle 10 notifies the HEMS 40 of vehicle information through the PLC communication at step S5 shown in FIG. 6. For example, the vehicle 10 sends to the HEMS 40, a remaining capacity (or State Of Charge, SOC) of the vehicle electric storage device 11, a vehicle identification number to identify the vehicle 10, and so on, as the vehicle information.

The HEMS 40 detects (obtains) the vehicle information sent from the vehicle 10 through the PLC communication at step H5.

Subsequently, the HEMS 40 notifies the vehicle 10 of HEMS information using the PLC communication at step H6. For example, the HEMS 40 notifies the vehicle 10 of the permissible current value (current rating) of the power cable 20 which the HEMS 40 has recognized (obtained) from the CPLT circuit of the plug-in station 30 and a rated voltage (voltage rating) of the HEMS 40. The vehicle 10 detects (obtains) the HEMS information sent through the PLC communication from the HEMS 40 at step S6.

Subsequently, the HEMS 40 notifies the vehicle 10 of the permissible current value (current rating) of the electric power cable 20 using the CPLT signal, at step H7. More specifically, the HEMS 40 oscillates the CPLT signal in such a manner that the duty cycle of the CPLT signal is within 10% to 96% and corresponds to the permissible current value (current rating) of the electric power cable 20, using the CPLT circuit 35. The CPLT signal at this point in time is a "specific signal", which is provided to the vehicle 10 (in actuality, to the CPLT terminal of the inlet 13) from the electric power cable 20, and which is to notify the vehicle 10 of the permissible current value of the electric power cable 20.

Further, the "relation between the duty cycle and the permissible current value" in this case is the same as the "relation between the duty cycle and the permissible current value", which the CPLT circuit 35 uses/employs during the "charge based on the usual request for charge" which does not depend on the communication. In other words, the known "standard used (to be applied) when the permissible current value of the power charge cable is transmitted to the vehicle 10 using the CPLT signal upon the usual request for charge without using the communication" is also used/ applied when the discharge based on the request for discharge using the communication is carried out. It should be noted that the voltage of the CPLT signal at this point in time (pulse voltage of the duty signal) is equal to V2 (=9 V).

At step S7, the vehicle 10 obtains/detects the permissible current value of the electric power cable 20 by converting the duty cycle of the CPLT signal transmitted/sent through (via) the CPLT signal line 23 into the "permissible current value of the electric power cable 20" in conformity to (or according to) the standard described above. The vehicle 10 uses the "permissible current value of the electric power cable 20 based on the duty cycle of the CPLT signal" obtained at step S7 or the "permissible current value of the electric power cable 20 included in the HEMS information transmitted from the HEMS 40 through the PLC communication" obtained at step S6, whichever is smaller, if they are different from each other, for a control of discharging. It should be noted that the vehicle 10 may preferentially use the "permissible current value of the electric power cable 20 obtained based on the duty cycle of the CPLT signal" for the control of discharging thereafter, if the "permissible current value of the electric power cable 20 based on the duty cycle of the CPLT signal" obtained at step S7 is different from the "permissible current value of the electric power cable 20 included in the HEMS information transmitted from the HEMS 40 through the PLC communication" obtained at step S6.

Subsequently, at step H8, the HEMS 40 notifies the vehicle 10 of the request for discharge through (using) the PLC communication. At step S8, the vehicle 10 detects the request for discharge transmitted through (using) the PLC communication. It should be noted that this process corresponds to a "No" determination at "step 230 shown in FIG. 7 at which the vehicle 10 determines whether or not the request for charge has been generated", and a "Yes" determination at "step 240 shown in FIG. 7 at which the vehicle 10 determines whether or not the request for discharge has been generated." Thereafter, the vehicle 10 proceeds to step 245 shown in FIG. 7 to execute the processes according to the request for discharge using (by) the communication.

That is, at step S9 shown in FIG. 6, the vehicle 10 notifies the HEMS 40 of discharge capability through (using) the PLC communication. More specifically, the vehicle 10 sends to the HEMS 40, as the discharge capability, information including: whether or not the discharge can be carried out at the present point in time; whether the electric power which will be discharged is a DC power or an AC power; the voltage, the current, and the frequency of the electric power which will be discharged; whether the electric power which will be discharged is a single-phase AC or a three-phase AC; a maximum energy which the vehicle can discharge; and so on.

Subsequently, at step H9, the HEMS 40 determines details of the request for discharge, based on the information on the discharge capability transmitted through the communication from the vehicle 10. Thereafter, at step H10, the HEMS 40 notifies the vehicle 10 of the details of the request for discharge through the PLC communication. The details of the request for discharge includes: for example, whether the electric power which the HEMS 40 requires is a DC power or an AC power; the voltage, the current, and the frequency of the electric power which the HEMS 40 requires; whether the electric power which the HEMS 40 requires is a single-phase AC or a three-phase AC; and so on.

At step S10, the vehicle 10 detects/obtains the request for discharge sent through the PLC communication from the HEMS 40. At step S11, the vehicle 10 determines whether or not the request for discharge (details of the request for discharge) can be satisfied, and notifies the HEMS 40 of a result of the determination through the PLC communication.

At step H11, the HEMS 40 detects/obtains the result of the determination sent from the vehicle 10.

Figure 8:
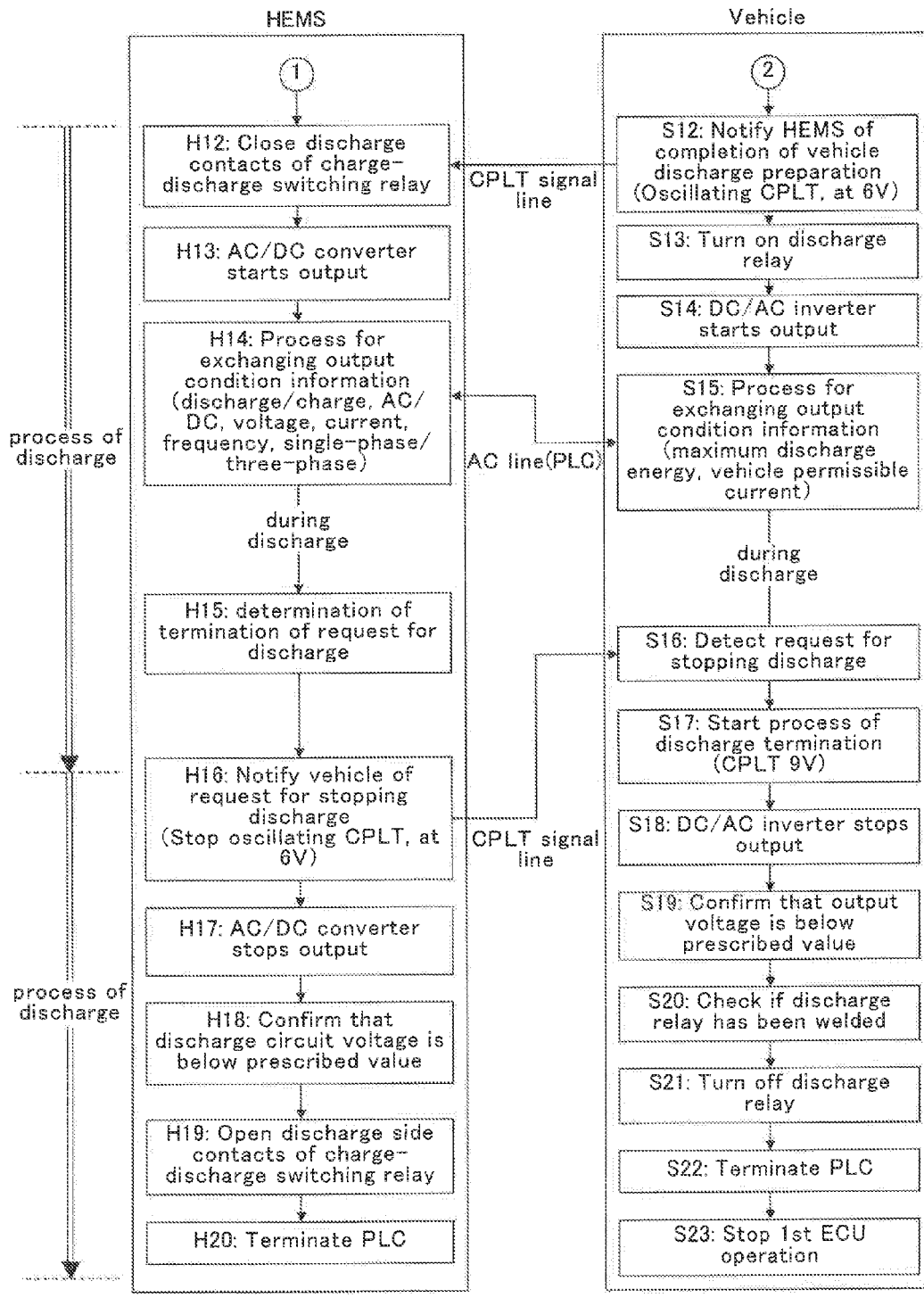
FIG. 8 is a process chart during discharging operation of the charge-discharge system shown in FIG. 2.

When the result of the determination indicates that the request for discharge from the HEMS 40 can be satisfied, the vehicle 10 notifies, using the CPLT signal line 23, the HEMS 40 of information indicating that the vehicle 10 has completed a preparation for discharge, at step S12 shown in FIG. 8. In actuality, the first electronic control unit 121c turns on an unillustrated switching element to lower the voltage (potential) at the CPLT terminal (i.e., the potential of the connection line C) from V2 to V3 (e.g., 6 V) which is smaller than V2.

When and after the HEMS 40 detects that the vehicle 10 has completed the preparation for discharge through the CPLT signal line 23, the HEMS 40 closes the discharge side contacts of the charge-discharge switching relay 34 of the plug-in station 30 at step H12, so as to connect the electric power lines 31, 32 with the discharge power lines Ph.

Subsequently, at step H13, the HEMS 40 starts to have the AC/DC converter 42 generate its output.

Meanwhile, the vehicle 10 closes the discharge relay 122b at step S13, and starts to have the DC/AC inverter 122a generate its output at step S14. Those processes described above allow supplying the electric power from the vehicle electric storage device 11 to the external electric storage device 41 serving as the external electric load (and/or the electric home appliances, etc.) to be started. In other words, the vehicle electric storage device 11 starts to be discharged.

The HEMS 40 and the vehicle 10 exchange information concerning the output conditions with each other through the PLC communication while the electric power is being supplied from the vehicle electric storage device 11 to the external electric load (i.e., during the discharge) (refer to step H14 and step S15, shown in FIG. 8). It should be noted that the vehicle 10 (in actuality, the first electronic control unit 121c) stops (the operation of) the DC/AC inverter 122a when the discharge current flowing through the electric power cable 20 exceeds the "obtained permissible current value (IMIN) of the electric power cable 20" while the discharge is being performed, and thereafter, opens the discharge relay 122b if necessary, so as to stop the discharge.

Thereafter, when the HEMS 40 determines that the request for discharge is over (step H15), the HEMS 40 notifies the vehicle 10 of request for stopping discharge through the CPLT signal line 23, at step H16. More specifically, the HEMS 40 makes the CPLT circuit 35 stop the oscillation of the CPLT signal. At this point in time, the voltage (potential) of the CPLT terminal of the inlet 13 (i.e., potential of the connection line C) is V3 (e.g., 6 V).

When the vehicle 10 detects the request for stopping discharge sent from the HEMS 40 at step S16, the vehicle 10 increases (raises) the voltage (potential) of the CPLT terminal of the inlet 13 (i.e., potential of the connection line C) to V2 (e.g., 9 V) in order to enter a state of discharge termination processes, at step S17. It should be noted that the vehicle 10 can end/terminate the discharge. In this case, the vehicle 10 may increase the voltage (potential) of the CPLT terminal of the inlet 13 (i.e., potential of the connection line C) to V2 (e.g., 9 V). Subsequently, the vehicle 10 stops the operation of the DC/AC inverter 122a, at step S18.

Subsequently, the vehicle 10 determines whether or not the discharge relay 122b has been welded, at step S19 and step S20. Specifically, the vehicle 10 waits for the output voltage of the DC/AC inverter 122a to lower down to a prescribed value after stopping the operation of the DC/AC inverter 122a, and thereafter, it closes one of the contacts of the discharge relay 122b and opens the other one of the contacts of the discharge relay 122b when the output voltage becomes a value equal to or lower than the prescribed value. Further, the vehicle 10 operates the DC/AC inverter 122a. If the output of the voltage sensor 121d of the battery charger 121a increases, the vehicle 10 determines that the relay contact which is opened has been welded.

Thereafter, the vehicle 10 opens the discharge relay 122b at step S21, and makes the PLC unit 123 execute processes to terminate the communication with the PLC unit 33 at step S22. Lastly, the vehicle 10 shuts down the first electronic control unit 121c at step S23 (the vehicle has the unit 121c enter into the sleep state). It should be noted that when the CPLT signal starts to oscillate (i.e., it changes into the duty signal) while the first electronic control unit 121c is in the sleep state, the first electronic control unit 121c boots up again.

After the HEMS 40 notifies the vehicle 10 of the request for stopping discharge at step H16 shown in FIG. 8, the HEMS 40 stops the operation of the AC/DC converter 42 of the HEMS 40 at step H17, waits for a discharge circuit voltage (output voltage of the AC/DC converter 42) to lower to a value equal to or lower than a prescribed value at step H18, and opens the discharge side contacts of the charge-discharge switching relay 34 at step H19. Thereafter, the HEMS 40 makes the PLC unit 33 execute processes to terminate the communication with the PLC unit 123 at step H20. Those described are the operations during the discharge using the communication.

<Charging Sequence Using Communication>

The charging sequence using the HEMS 40 will next be described briefly with reference to FIGS. 9 and 10. The HEMS 40 charges the electric storage device 11 using the communication (communication signals) between the PLC unit 33 and the PLC unit 123. This type of charge is also referred to as a "charge (charging) using communication", hereinafter. It should be noted that the charge of the electric storage device 11 which does not depend on the communication is referred to as a "usual charge." A description of the process which has been described in the description regarding the discharging sequence is simplified or omitted, hereinafter.

Firstly, the user connects the connector 21 of the electric power cable 20 to the inlet 13 of the vehicle 10. A way to detect whether or not the connector 21 is in the complete fitting state is the same as one used in the discharging sequence.

Figure 9:
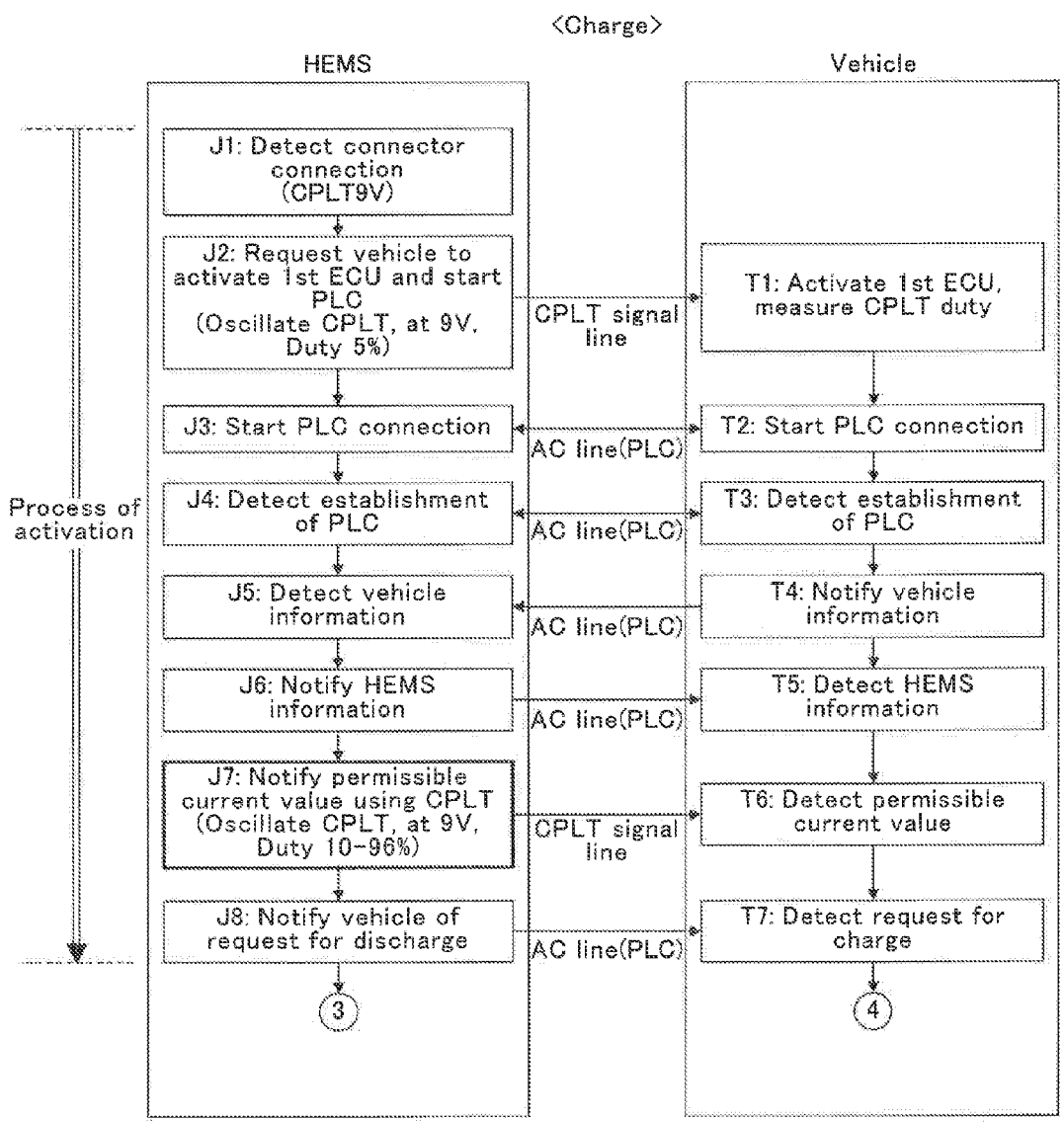
FIG. 9 is a process chart during charging operation of the charge-discharge system shown in FIG. 2.

The HEMS 40 determines that the connector 21 has been connected with the inlet 13 when it detects that the voltage of the receiving side CPLT terminal has dropped from V1 to V2 (e.g., 9 V) at step J1 shown in FIG. 9, oscillates the CPLT signal with a duty cycle 5% at step J2, and sends to the vehicle 10, using the CPLT signal line 23, "the request for starting the PLC communication and the vehicle activating request (first electronic control unit activating request)."

The vehicle 10 activates the first electronic control unit 121c and measures the duty cycle of the CPLT signal, at step T1 shown in FIG. 9. In this case, the duty cycle of the CPLT signal is not within "10% to 96% to indicate the usual charge" which is defined/prescribed in the standard, but is equal to "5% to indicate the charge and discharge using the communication." Accordingly, the vehicle 10 starts the PLC connection at step T2. Simultaneously, the HEMS 40 starts the PLC connection at step J3. After both the HEMS 40 and the vehicle 10 confirm that the PLC connection has been established at step J4 and step T3, respectively, the vehicle 10 notifies the HEMS 40 of the vehicle information through the PLC communication at step T4, similarly to step S5 shown in FIG. 6. The HEMS 40 detects the vehicle information at step J5.

The HEMS 40 notifies the vehicle 10 of the HEMS information through the PLC communication, at step J6. At this point in time, the HEMS information does not include "information concerning a permissible current value of the electric power cable 20." However, the "information concerning the permissible current value of the electric power cable 20" may be included in the HEMS information which is transmitted through the PLC communication, as needed. At step T5, the vehicle 10 detects/obtains the HEMS information.

Subsequently, the HEMS 40 notifies the permissible current value (current rating) of the electric power cable 20 using the CPLT signal, at step J7. In this case as well, the HEMS 40 oscillates the CPLT signal, using the CPLT circuit, in such a manner that the duty cycle of the CPLT signal becomes within the 10% to 96% and is equal to a duty cycle prescribed/predetermined with respect to the permissible current value of the electric power cable 20 in conformity to the standard. In other words, the standard to transmit the "permissible current value of the power charge cable upon the usual request for charge which does not depend on the communication" to the vehicle 10 using the CPLT signal is also used upon the charge based on the request for charge using the communication.

At step T6, the vehicle 10 obtains/detects the permissible current value of the electric power cable 20 by converting the duty cycle of the CPLT signal transmitted/sent through (via) the CPLT signal line 23 into the "permissible current value of the electric power cable 20" in conformity to (or according to) the standard described above. Thereafter, at step J8, the HEMS 40 notifies the vehicle 10 of the request for charge through (using) the PLC communication. At step T7, the vehicle 10 detects the request for charge transmitted through (using) the PLC communication. It should be noted that this process corresponds to a "Yes" determination at step 230 shown in FIG. 7. Thereafter, the vehicle 10 proceeds to step 235 shown in FIG. 7 to execute the processes according to the request for charge through the communication.

Figure 10:
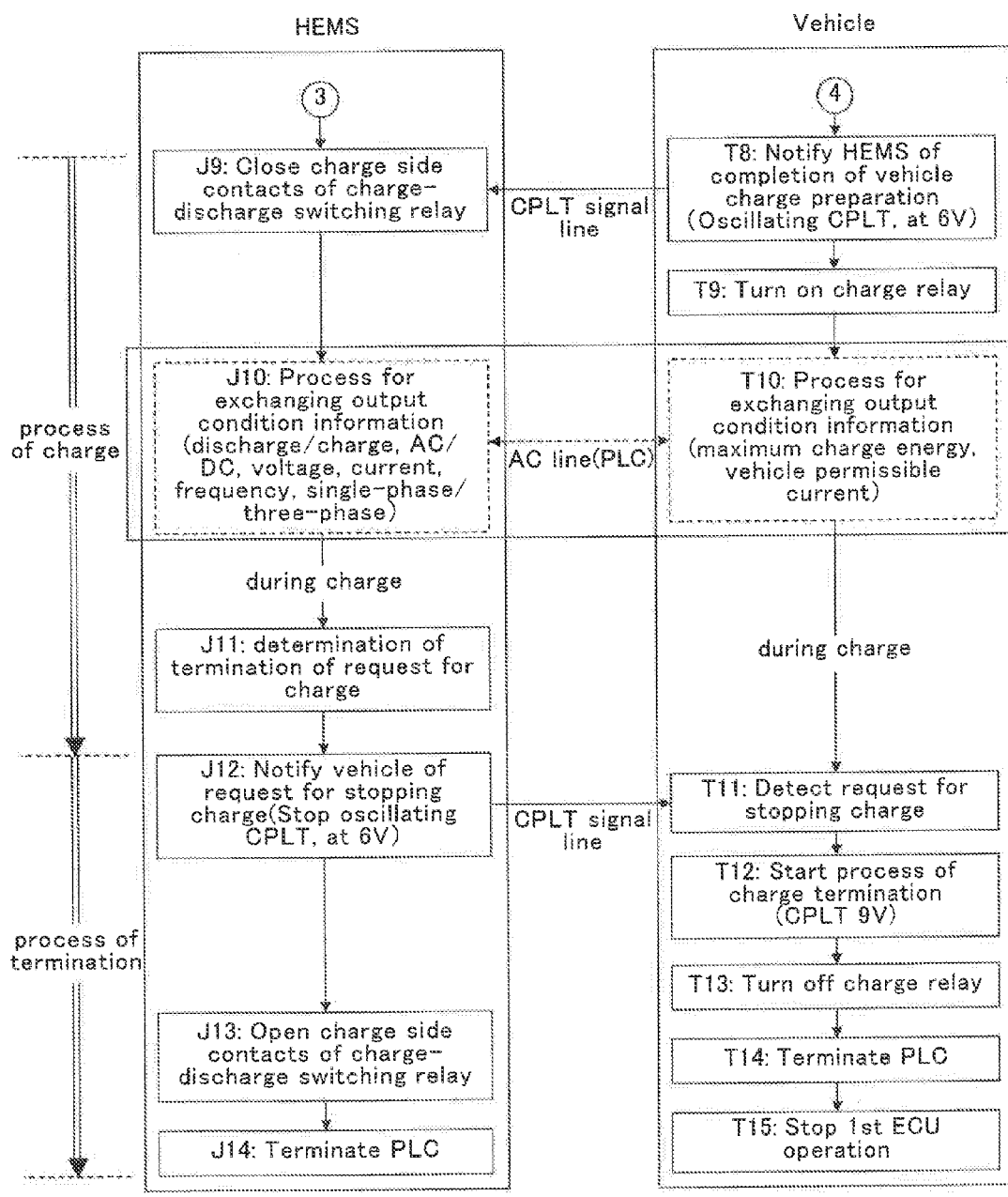
FIG. 10 is a process chart during charging operation of the charge-discharge system shown in FIG. 2.

That is, at step T8 shown in FIG. 10, the vehicle 10 notifies, using the CPLT signal line 23, the HEMS 40 of information indicating that the vehicle 10 has completed a preparation for charge. In actuality, the first electronic control unit 121c lowers the voltage (potential) at the CPLT terminal of the inlet 13 (i.e., the potential of the connection line C) to V3 (e.g., 6 V) which is smaller than V2. Thereafter, the vehicle 10 closes the charge relay 121b of the vehicle 10 at step T9.

When and after the HEMS 40 detects that the vehicle 10 has completed the preparation for charge, the HEMS 40 closes the charge side contacts of the charge-discharge switching relay 34 of the plug-in station 30 at step J9 shown in FIG. 10, so as to connect the electric power lines 31a, 32a with the charge power lines Pj. This starts the charge of the electric storage device 11 by (using) the external power supply. During the charge of the electric storage device 11 using the external power supply, the HEMS 40 and the vehicle 10 exchange information concerning the output conditions with each other through the PLC communication (step J10 and step T10, shown in FIG. 10).

Thereafter, when the HEMS 40 determines that the request for charge becomes over (step J11), the HEMS 40 notifies the vehicle 10 of request for stopping charge through the CPLT signal line 23, at step J12. More specifically, the HEMS 40 makes the CPLT circuit 35 stop oscillation of the CPLT signal. At this point in time, the voltage (potential) of the CPLT terminal of the inlet 13 (i.e., potential of the connection line C) is V3 (e.g., 6 V).

When the vehicle 10 detects the request for stopping charge from the HEMS 40 at step T11, the vehicle 10 increases (raises) the voltage (potential) of the CPLT terminal of the inlet 13 (i.e., potential of the connection line C) to V2 (e.g., 9 V) in order to enter a state of charge termination processes, at step T12. It should be noted that the vehicle 10 can end/terminate the charge. In that case, the vehicle 10 may increase the voltage (potential) of the CPLT terminal of the inlet 13 (i.e., potential of the connection line C) to V2 (e.g., 9 V). Subsequently, the vehicle 10 opens the charge relay 121b of the vehicle 10 at step T13, and makes the PLC unit 123 execute processes to terminate the communication with the PLC unit 33 at step T14. Lastly, the vehicle 10 shuts down the first electronic control unit 121c at step T15 (it has the unit 121c enter into the sleep state).

After the HEMS 40 notifies the vehicle 10 of the request for stopping charge at step J12, the HEMS 40 opens the charge side contacts of the charge-discharge switching relay 34 at step J13. Thereafter, the HEMS 40 makes the PLC unit 33 execute processes to terminate the communication with the PLC unit 123, at step J14. Those described are the operations during the charge using the communication.

As described above, the vehicle 10 according to the embodiment of the present invention comprises:

an inlet (13) to/with which a connector of an electric power cable (20) is connected;

an electric storage section (11, 124) which can be discharged to an external electric load through the electric power cable (20); and a control device (12, 121c) which controls discharging from the electric storage section to the external electric load in a state in which (while) the connector is connected with the inlet;

wherein, the control device (12, 121c) is configured so as to obtain/detect a permissible current value (current rating) of the electric power cable based on a specific signal (control pilot signal) sent from the electric power cable, before starting discharging (refer to step H7 and step S7 shown in FIG. 6, steps from step H12 to H14 shown in FIG. 8, and steps from step S12 to S15 shown in FIG. 8).

Further, the electric storage section (electric storage device 11, and so on) is capable of being charged using an electric power supplied from an external power supply (50, 41, and so on) through the electric power cable (20);

the inlet (13) includes a receiving side CPLT terminal which is electrically connected with a sending side CPLT terminal to receive a control pilot signal in a state the connector (21) of the electric power cable (20) is connected with the inlet (13), the sending side CPLT terminal being a terminal, which the connector of the electric power cable includes, and to which the control pilot signal representing a permissible current value of the electric power cable is provided when charging the electric storage section; and the control device (12, 121c) is configured so as to obtain/detects, in the state in which the connector (21) of the electric power cable (20) is connected with the inlet (13), based on the control pilot signal, the permissible current value of the electric power cable before starting charging the electric storage section using the electric power supplied from the external power supply (refer to step J7 and step T6 shown in FIG. 9, step J9 and step J10 shown in FIG. 10, and steps from step T8 to T10 shown in FIG. 10), and so as to receive the specific signal (CPLT signal) through the receiving side CPLT terminal (step S7 shown in FIG. 6).

Further, the control device (12, 121c) is configured so as to include a second communication unit (123) capable of communicating with a first communication unit (33) provided at a location external to the vehicle through the electric power cable (20), so as to start discharging in response to a request for discharge which is transmitted to the second communication unit from the first communication unit (refer to step 240 and step 245 shown in FIG. 7, steps from step H8 to H11 shown in FIG. 6, and steps from S12 to S14 shown in FIG. 8), and so as to obtain the specific signal (CPLT signal) without using the second communication unit (refer to step H7 and step S7 shown in FIG. 6).

Accordingly, without changing the conventional standards, the discharge of the vehicle electric storage device 11 using the communication can be carried out based on an accurate permissible current value (current rating) of the electric power cable 20.

It should be noted that the present invention is not limited to the above-described embodiment, and may be modified in various manners within the scope of the present invention. For example, although the communication between the HEMS 40 and the vehicle 10 is performed using the PLC, the communication may be performed according to a certain protocol by superimposing a communication signal on the control pilot signal on the CPLT signal line 23.

Further, although the charge and the discharge of the vehicle electric storage device 11 are carried out using the AC power, they can be carried out using the DC power. In addition, the plug-in station 30 may be included in the HEMS 40. Furthermore, the charge-discharge switching relay 34 may be disposed in the HEMS 40. Further, step H6 shown in FIG. 6 may be omitted.

The invention claimed is:

1. A vehicle comprising:
an inlet with which a connector of an electric power cable is connected;
an electric storage section which can be discharged to an external electric load through said electric power cable; and
a control device, which is configured so as to control discharge from said electric storage section to said external electric load in a state in which said connector is connected with said inlet, and so as to obtain a permissible current value of said electric power cable before starting said discharge;
wherein,
said control device is configured:
so as to obtain said permissible current value of said electric power cable based on a control pilot signal sent through said electric power cable from a CPLT circuit connected with said electric power cable;
so as to include a second communication unit capable of communicating with a first communication unit provided at a location external to said vehicle through said electric power cable, and obtain said permissible current value of said electric power cable transmitted from said first communication unit to said second communication unit through communication; and
so as to control said discharge from said electric storage section to said external electric load, based on either said permissible current value transmitted from said first communication unit to said second communication unit through communication or said permissible current value obtained based on said control pilot signal, whichever is smaller.

2. The vehicle according to claim 1, wherein,
said control device is configured so as to transmit, to said first communication unit from said second communication unit through communication, information relating to discharge capability including a current of an electric power which will be discharged, according to a request for discharge transmitted from said first communication unit to said second communication unit through communication.

3. A discharge system having:
an electric power cable including a connector; and
a vehicle comprising an electric storage section which can be discharged to an external electric load through said electric power cable, an inlet with which said connector is connected, and a control device which controls discharge from said electric storage section to said external electric load in a state in which said connector is connected with said inlet;
wherein,
said electric power cable is configured so as to be able to provide a control pilot signal representing a permissible current value of said electric power cable to said control device from a CPLT circuit connected with said electric power cable;
said control device is configured:
so as to obtain, based on said control pilot signal from said electric power cable, said permissible current value before starting said discharge;
so as to include a second communication unit capable of communicating with a first communication unit provided at a location external to said vehicle through said electric power cable, and so as to obtain said permissible current value of said electric power cable transmitted from said first communication unit to said second communication unit through communication; and
so as to control said discharge from said electric storage section to said external electric load, based on either said permissible current value transmitted from said first communication unit to said second communication unit or said permissible current value obtained based on said control pilot signal, whichever is smaller.

4. The discharge system according to claim 3, wherein,
said control device is configured so as to transmit, to said first communication unit from said second communication unit through communication, information relating to discharge capability including a current of an electric power which will be discharged, according to a request for discharge transmitted from said first communication unit to said second communication unit through communication.

5. A discharge control method of a vehicle having:
an inlet with which a connector of an electric power cable is connected;
an electric storage section which can be discharged to an external electric load through said electric power cable and can be charged using an electric power supplied from an external power supply through said electric power cable; and
a control device which controls discharge from said electric storage section to said external electric load in a state in which said connector is connected with said inlet,
wherein, said control device includes a second communication unit capable of communicating with a first communication unit provided at a location external to said vehicle through said electric power cable, said method comprising steps of:
providing a control pilot signal representing a permissible current value of said electric power cable to said control device through said electric power cable from a CPLT circuit connected with said electric power cable, and transmitting, to said second communication unit from said first communication unit through communication, said permissible current value of said electric power cable, before starting said discharge to said external electric load in said state in which said connector is connected with said inlet; and controlling said discharge from said electric storage section to said external electric load, based on either said permissible current value transmitted from said first communication unit to said second communication unit through communication or said permissible current value obtained based on said control pilot signal, whichever is smaller.

6. The discharge control method of a vehicle according to claim 5, further comprising a step of transmitting, to said first communication unit from said second communication unit through communication, information relating to discharge capability including a current of an electric power which will be discharged, according to a request for discharge transmitted from said first communication unit to said second communication unit through communication.

7. The vehicle according to claim 1, wherein, said CPLT circuit is a circuit configured so as to provide said control pilot signal.

8. The discharge system according to claim 3, wherein, said CPLT circuit is a circuit configured so as to provide said control pilot signal.

9. The discharge control method of a vehicle according to claim 5, wherein, said CPLT circuit is a circuit configured so as to provide said control pilot signal.

* * * * *